United States Patent
Ogawa et al.

(10) Patent No.: US 7,683,943 B2
(45) Date of Patent: Mar. 23, 2010

(54) IMAGE RECORDING APPARATUS, IMAGE REPRODUCING APPARATUS, METHOD OF CONTROLLING IMAGE RECORDING APPARATUS, METHOD OF CONTROLLING IMAGE REPRODUCING APPARATUS, COMPUTER PROGRAM, AND RECORDING MEDIUM

(75) Inventors: Yasuyuki Ogawa, Tokyo (JP); Akira Suga, Tokyo (JP); Makoto Gohda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 828 days.

(21) Appl. No.: 11/275,297

(22) Filed: Dec. 22, 2005

(65) Prior Publication Data

US 2007/0147787 A1 Jun. 28, 2007

(51) Int. Cl.
*H04N 5/76* (2006.01)
(52) U.S. Cl. .................. 348/231.6; 348/231.4; 386/124
(58) Field of Classification Search . 348/231.99–231.9, 348/231.4, 231.6; 386/45, 46, 68, 95, 120, 386/121, 125, 126, 124; 396/281; 704/278
See application file for complete search history.

(56) References Cited

U.S. PATENT DOCUMENTS

| | | | | |
|---|---|---|---|---|
| 5,903,309 A | * | 5/1999 | Anderson | 348/333.02 |
| 6,339,760 B1 | * | 1/2002 | Koda et al. | 704/278 |
| 7,046,275 B1 | * | 5/2006 | Yamada et al. | 348/220.1 |
| 7,212,726 B2 | * | 5/2007 | Zetts | 386/68 |
| 2001/0028796 A1 | * | 10/2001 | Yamanaka et al. | 396/281 |
| 2002/0154226 A1 | | 10/2002 | Gohda | 348/231.3 |
| 2002/0191952 A1 | * | 12/2002 | Fiore et al. | 386/46 |
| 2004/0046877 A1 | * | 3/2004 | Shibutani | 348/231.1 |
| 2007/0035623 A1 | * | 2/2007 | Garoutte et al. | 348/143 |

FOREIGN PATENT DOCUMENTS

| | | |
|---|---|---|
| JP | 2000-287162 | 10/2000 |
| JP | 2002-51302 | 2/2002 |

OTHER PUBLICATIONS

Tsurozoh Tachibanaya, "Description of EXIF File Format," internet web page, Feb. 3, 2001.*
Garoutte et al., "Directed Attention Digital Video Recordation," U.S. Appl. No. 60/701,804, domestic priority document for U.S. Appl. No. 11/491,485.*
Garoutte et al., "Object Selective Video Recording," U.S. Appl. No. 10/041,402, incorporated by reference into U.S. Appl. No. 11/491,485.*

* cited by examiner

*Primary Examiner*—Lin Ye
*Assistant Examiner*—Dennis Hogue
(74) *Attorney, Agent, or Firm*—Fitzpatrick, Cella, Harper & Scinto

(57) ABSTRACT

A system, method and computer program product for arranging digital data in a file in an apparatus-implemented system, is disclosed. One or more pages are generated, where each page includes: i. a mode field containing a camera operation mode, ii. an image data field containing image data, iii. an offset field containing an offset to a next page in the file, and a total size field containing a page size. Each page is recorded in the file using the same format.

31 Claims, 22 Drawing Sheets

▶ Next Page Control (enabled)
◀ Previous Page Control (enabled)
◁ Previous Page Control (disabled)
▷ Next Page Control (disabled)

FIG. 11A
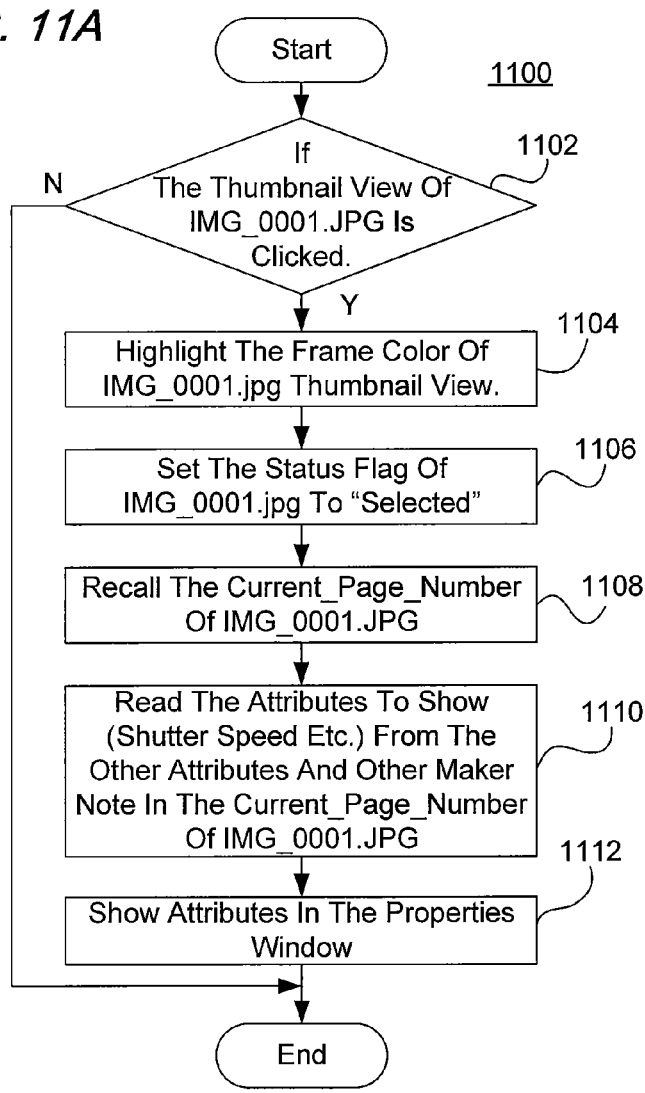
FIG. 11B
- ▶ Next Page Control (enabled)
- ◀ Previous Page Control (enabled)
- ◁ Previous Page Control (disabled)
- ▷ Next Page Control (disabled)
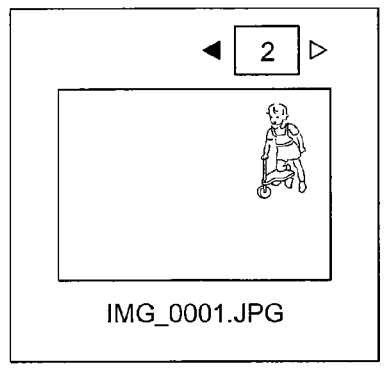
IMG_0001.JPG
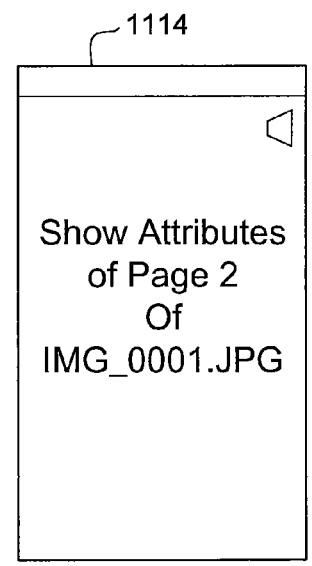
Show Attributes of Page 2 Of IMG_0001.JPG

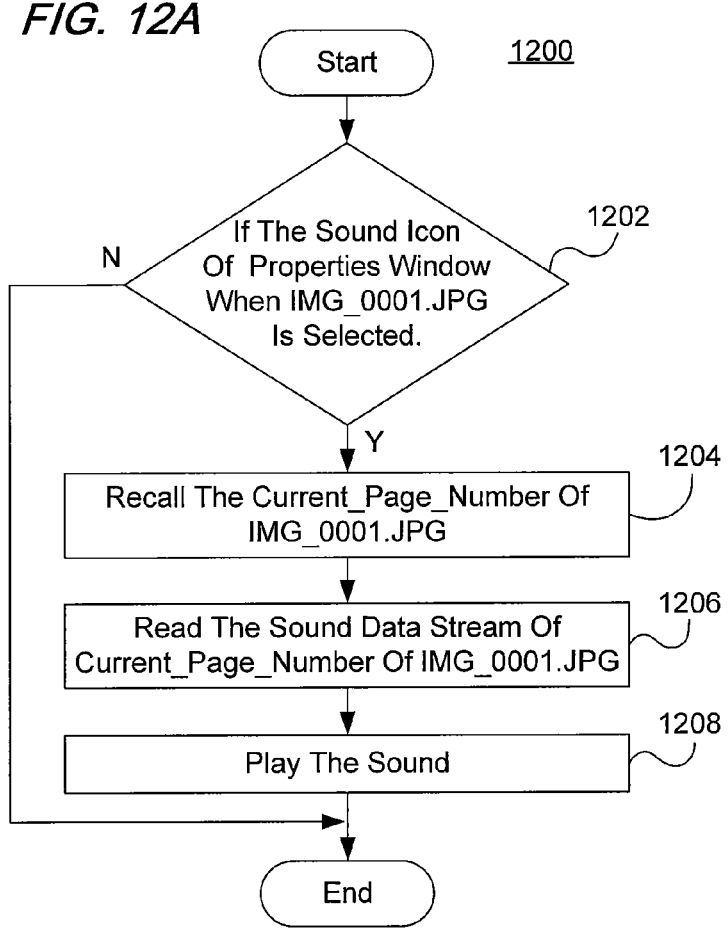
FIG. 12A
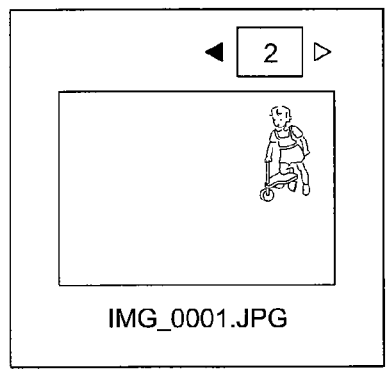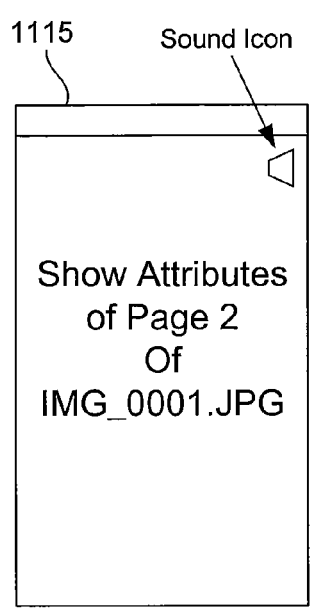
FIG. 12B
- ▶ Next Page Control (enabled)
- ◀ Previous Page Control (enabled)
- ◁ Previous Page Control (disabled)
- ▷ Next Page Control (disabled)

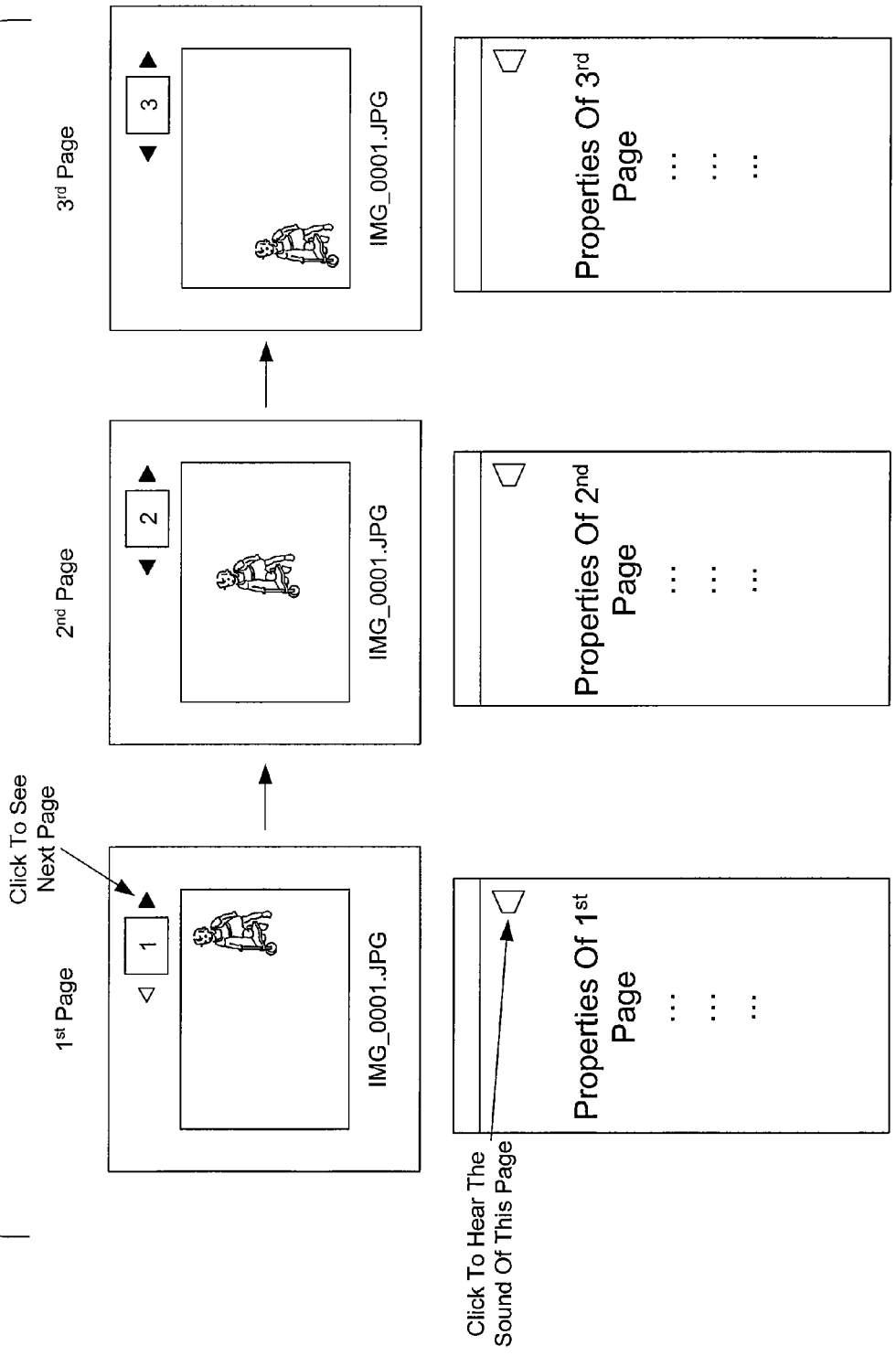

FIG. 14B
▶  Next Page Control (enabled)
◀  Previous Page Control (enabled)
◁  Previous Page Control (disabled)
▷  Next Page Control (disabled)
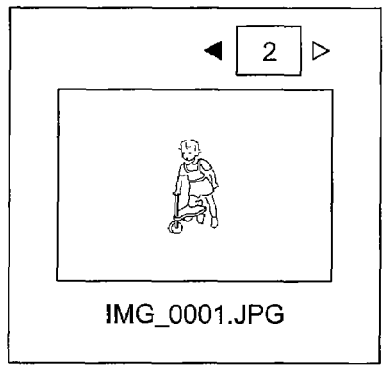
IMG_0001.JPG
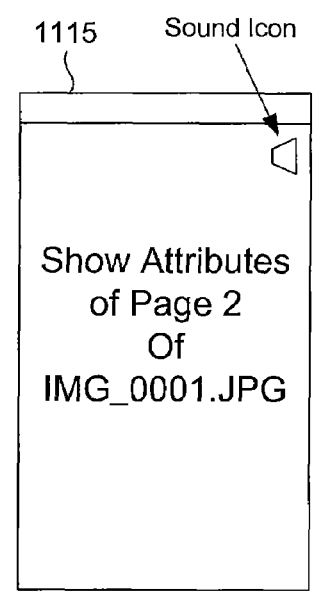
1115
Sound Icon
Show Attributes
of Page 2
Of
IMG_0001.JPG

IMAGE RECORDING APPARATUS, IMAGE REPRODUCING APPARATUS, METHOD OF CONTROLLING IMAGE RECORDING APPARATUS, METHOD OF CONTROLLING IMAGE REPRODUCING APPARATUS, COMPUTER PROGRAM, AND RECORDING MEDIUM

BACKGROUND OF THE INVENTION

1. Field of the Invention

The present invention relates to recording and reproducing apparatuses, and more particularly to recording apparatuses capable of recording digital data using a single-file format and to reproducing apparatuses for reproducing a file recorded in a single-file format.

2. Background of the Invention

In recent years, digital recording apparatuses such as digital cameras and camcorders have rapidly become more popular. This popularity is due in part because there is no film involved. Images are saved in memory for downloading to a personal computer (PC) and instead of loading film, rewinding it, having it processed and paying for prints, an operator can edit and crop the digital images using PC software and print the results on a color printer. Such editing and enhancing operations can be performed directly on the recording apparatus or on the PC. Furthermore, digital images can be composed after the fact by reframing them.

At the heart of any digital recording apparatus is a microprocessor, FPGA, ASIC, or other processing device for executing computer software to perform various camera operation features. In recent years, these processing devices have become not only smaller and more efficient, but more powerful as well. Manufacturers are using this power to make digital recording apparatuses easier to use and to incorporate in them a variety of advanced features.

For example, many of today's digital recording apparatuses can operate in several recording modes, such as a still mode for recording individual photographic frames, a continuous mode for recording a series of photographic frames, and a movie mode for recording photographic frames at video frame rates, as well as sound. Some of today's recording apparatus also have an audio recording feature for including recorded audio with movie image files or recording separate audio files. Similarly, text can be input by the operator, which can also be overlaid onto a reproduced image or saved as individual text files. In each of the above-mentioned modes, the recording apparatus creates files which are organized in one or more directories in a memory.

Recorded files, such as digital still image files, digital movie files, digital audio files, and text files are processed and reproduced by a host of different reproducing apparatuses, such as PCs, specialized printers, recording apparatuses, digital audio players, and the like. Once stored in memory, the files can be administered (e.g., edited, enhanced, reproduced, erased and the like) on an individual basis. A movie file, for example, typically consists of several frames. Administering a movie file involves opening the file and accessing the movie stream on a frame-by-frame basis.

Various standards have been established in an attempt to provide a uniform set of guidelines for arranging digital data in a file and organizing the files in a storage device. For example, the Exchangeable Image File Format ("EXIF") standard provides rules for storing information in image files, such as exposure details, and for using JPEG compression. Another standard, the "Design Rule for Camera File" (or "DCF") standard, specifies rules which add limitations to the EXIF standard for the sake of playback compatibility. In particular, the DCF standard defines how an image is stored as well as its filename extension. An image file or "DCF Basic File" is stored under a DCF directory, has a DCF filename and extension, and as mentioned above, a data structure in compliance with the EXIF standard. Image data in a DCF Basic file is compressed using the JPEG-compression algorithms, where the JPEG compression used is lossy. A DCF-compatible digital camera, for example, can display images recorded with other DCF-compatible digital cameras. Also, a DCF-compatible printer can be used to print images from DCF-compatible cameras of different makes. DCF-compatible software also supports importing images from DCF images, regardless of their source.

Standards also have been established in an attempt to provide a uniform set of guidelines for interfacing recording and reproducing apparatus. For example, PictBridge™ technology enables a recording apparatus to be directly connected to a printer via a Universal Serial Bus ("USB") cable to print one or more image frames. This interface technique also converts the frame data to be compatible with the interface.

Methods have been proposed for administrating how image data is recorded on a recording medium. One proposed method is disclosed in Japan Laid Open No. JPA-2002051302 (Hiroki et al.). Hiroki et al. disclose generating administrative information such as recording mode, type of image, and the like, simultaneously with the image recording operation. When image data is transferred to a memory card, the central processing unit ("CPU") combines the administrative information with the image data. The administration information is organized as the combination of a header and the image data, where the header information corresponds to the selected recording mode. In a continuous mode, for example, the header of the file can include information such as group number, group type, number of image files, and image file serial numbers.

Japanese Laid Open No. JPA-2000287162 (Junya) discloses a digital camera that can reproduce several still images at different frame rates. The Junya camera records onto a memory card a primary file including still pictures as well as index information to manage the respective still pictures. The primary file also includes a thumbnail file including thumbnail still pictures corresponding to the respective still pictures and index information to manage the respective thumbnail still pictures. When reproducing the data, a CPU reproduces a still picture for each frame at a "usual" speed on the basis of an index table generated on the basis of two index information sets. When high speed reproduction is instructed, the CPU reproduces thumbnail still pictures after a second frame and succeeding frames in response to an end signal from a JPEG coder/decoder ("CODEC").

The above-described techniques require image administration information, such as how the digital image files are stored and indexed in memory, as well as information relating to the image taking parameters. In many cases, the image administration information is prepared separately for each image recording. As a result, administering a file must be performed on frame-by-frame basis and requires editing of the image administration information. Since the administration information data is grouped separately from the image data, editing such image files becomes complex.

SUMMARY OF THE INVENTION

To be completed after initial review

BRIEF DESCRIPTION OF THE DRAWINGS

FIG. 11A is a flowchart showing a process for displaying attributes associated with a selected digital image in accordance with the present invention.

FIG. 11B shows a screenshot of an image thumbnail and a window for showing the attributes associated with the image thumbnail in accordance with the flowchart depicted in FIG. 11A.

FIG. 12A is a flowchart showing a process for playing an audio stream stored within a file in accordance with the present invention.

FIG. 12B shows a screenshot of a thumbnail and properties windows including a speaker icon in accordance with the flowchart depicted in FIG. 12A.

FIG. 13 shows a sequence of screenshots corresponding to a series of images and their associated attributes.

FIG. 14B shows a screen shot of a thumbnail displayed in accordance with the flowchart depicted in FIG. 14A.

DETAILED DESCRIPTION

An embodiment of the present invention will now be described with reference to the accompanying drawings.

Figure 1:
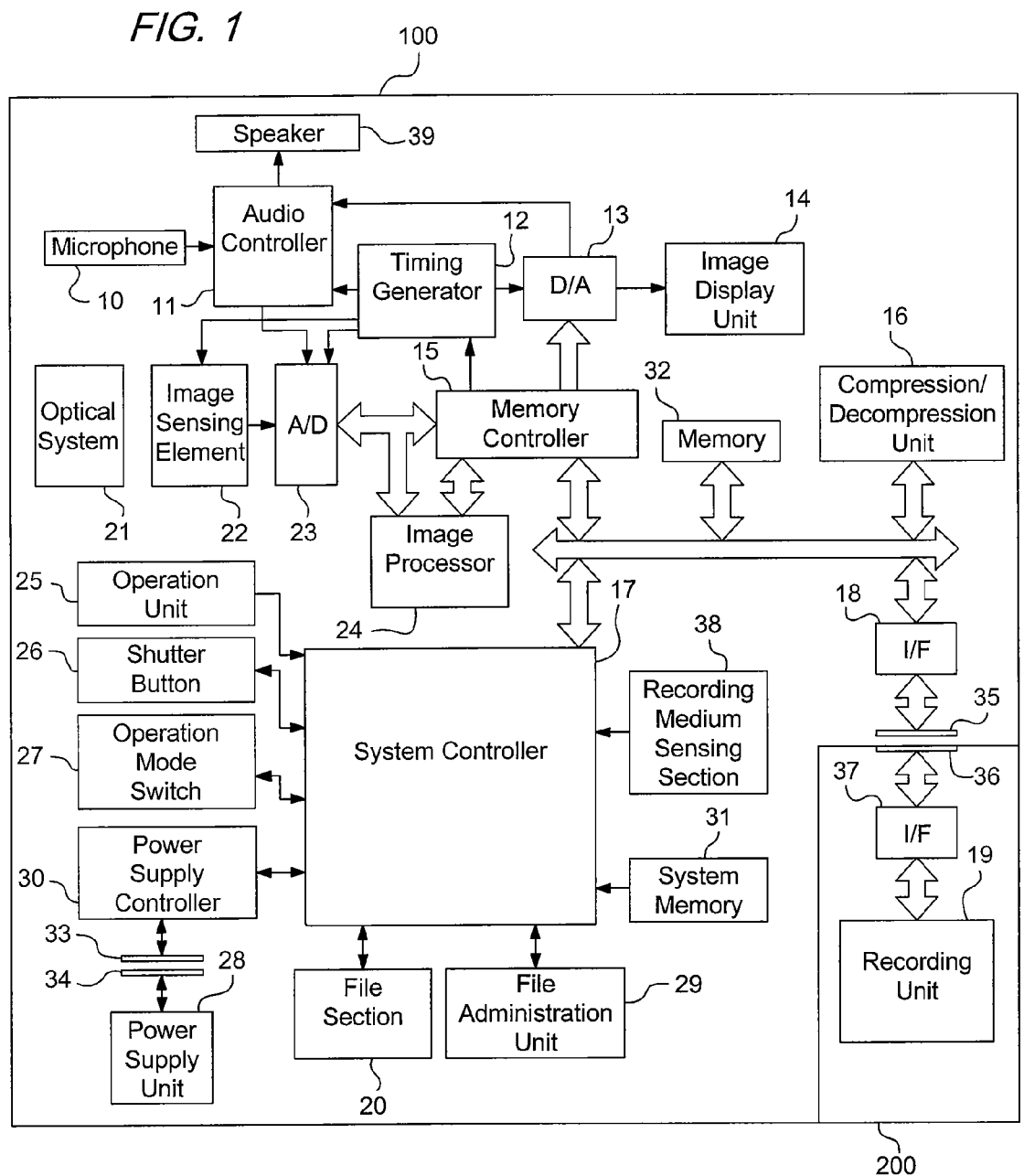
FIG. 1 is a schematic block diagram of a digital camera which is operable as an image recording apparatus and as an image reproducing apparatus embodying the present invention.

FIG. 1 is a schematic block diagram of a digital camera which is operable as an image recording apparatus and as an image reproducing apparatus embodying the present invention. In FIG. 1, the entire digital camera is denoted by numeral 100. The digital camera 100 includes: an optical system 21 including lenses; an image sensing element 22 which converts an optical image into analog electrical signals and which includes, for example, CCD or MOS elements; and an A/D converter 23 for converting analog signals produced by image sensing element 22 and an audio controller 11 into digital signals.

A system controller 17 controls the entire digital camera 100. Constants, variables and programs for the operations of system controller 17 are stored in system memory 31. The digital camera 100 also has a timing generator 12 which supplies clock signals and control signals to image sensing element 22, audio control section 11, A/D converter 23 and a D/A converter 13. An image processor 24 performs image processing on the data delivered from A/D converter 23 or the data received from a memory controller 15, such as predetermined pixel interpolation processing, color conversion processing, image resizing processing, and the like. Image processor 24 also executes predetermined arithmetic operations based on the sensed image data. Based on the results of the arithmetic operation performed by image processor 24, system controller 17 controls exposure and performs range processing. More particularly, system controller 17 performs processing operations such as a TTL (Through-The-Lens), AF (Auto-Focus), AE (Automatic Exposure), and EF (Electronic Pre-Flash) processing. Image processor 24 also performs a TTL AWB (Auto-White-Balance) processing based on the results of the arithmetic operation.

Audio signals output from a microphone 10 are conditioned by audio controller 11. The conditioned audio signals are then fed to A/D converter 23 which converts the audio signals into digital audio data.

Still and movie image signals from image sensing element 22 and audio signals from audio controller 11 are converted by A/D converter 23 and stored in a memory 32 under the control of memory controller 15. In addition, digital data in memory 32 necessary to display an image on image display unit 14 or provide sound through a speaker 39 through both D/A converter 13 are managed by memory controller 15.

A compression/decompression unit 16 performs compression and decompression of image data stored in memory 32 by, for example, Adaptive Discrete Cosine Transformation (ADCT). More specifically, a shutter button 26 is used to trigger an image taking operation. When the shutter button 26 is selected, it triggers compression/decompression unit 16 to read and compress image data. The compressed data is also stored in memory 32.

Compression/decompression section 16 also serves to read and decompress compressed images which have been written into memory 32 from, for example, a recording unit 19, and writes the decompressed data in memory 32.

Image data written in memory 32 is formed into files by a file section 20. In particular, file section 20 arranges the data into a file by adding file header data to the compressed data stored in memory 32 and produces file entry information and file allocation information (e.g., FAT information) necessary to store the arranged digital data into a recording medium 200. As will be described below in more detail, file section 20 generates an image file header and combines it with the compressed data based on the conditions under which the image is taken and in accordance with the data structure depicted in FIG. 2. File section 20 also records files thus formed in a storage medium 200 through an interface 18.

File administrator unit 29 controls the naming of digital image files and handles operations related to playing such digital image files on camera 100.

Digital audio data is read from storage medium 200 into memory 32 and fed to audio controller 11 after being converted into analog signals by D/A converter 13. Audio controller 11 performs audio signal processing on the analog audio signals before they are vocalized through a speaker 39.

An operation unit 25 includes various switches and buttons as well as a touch panel. The switches and buttons of operation unit 25 include an erasure button, a menu button, a set button, and a cross key. A menu screen enables various modes to be set based on selections displayed on the image display unit 14. Users can viscerally set various modes of operation by using the cross key and the set button, while observing the menu screen displayed on the image display unit 14.

As mentioned above, shutter button 26 is used to trigger the image taking operation. More particularly, the shutter button 26 has a two-staged switch structure having a switch SW1 and a switch SW2, namely, a shutter button for triggering the operation for taking still image and a movie shooting start button which triggers the operation for taking a movie.

An operation mode switch 27 sets the operation mode of system controller 17 to either still mode, continuous mode, movie mode or reproducing mode.

A power supply controller 30 includes a battery sensing circuit, a DC-DC converter, and a switching circuit which selects a block to which the electrical power is to be supplied. Thus, power supply controller 30 senses the presence or absence of a battery, type of the battery, and the remaining capacity of the battery. Power supply controller 30 also controls the DC-DC converter based on the result of the sensing and in accordance with instructions given by system controller 17, thereby supplying various sections including a recording unit 19 with electrical power at required voltages over required periods.

A power supply unit 28 includes a primary battery such as an alkaline battery or a lithium battery, a secondary battery such as an NiCd battery or an Li battery, or an AC adapter. Connectors 33 and 34 provide electrical connection between power supply unit 28 and power supply controller 30.

The aforementioned interface 18 serves to enable communication between the digital camera and storage medium 200 such as a memory card or a hard disk. Storage medium 200 is connected to interface 18 through a connector 35. A recording medium sensing unit 38 senses whether storage medium 200 is electronically connected to interface 18 by connectors 35 and 36.

Storage medium 200, such as a memory card or a hard disk has the recording unit 19 implemented by a semiconductor memory or a magnetic disk, an interface 37 for communication with the digital camera 100, and a connector 36 which provides connection between storage medium 200 and the digital camera 100.

In an alternative embodiment system controller 17 is operable to perform the functionality described above with respect to image processor 24 and compression/decompression unit 16. For example, system controller 17 can also be operable to perform digital image processing functions relating to brightness, contrast, chromaticity, hue, color temperature, contour emphasis, and the like. In addition, system controller 17 can also perform data compression operations on the image data.

Figure 2:
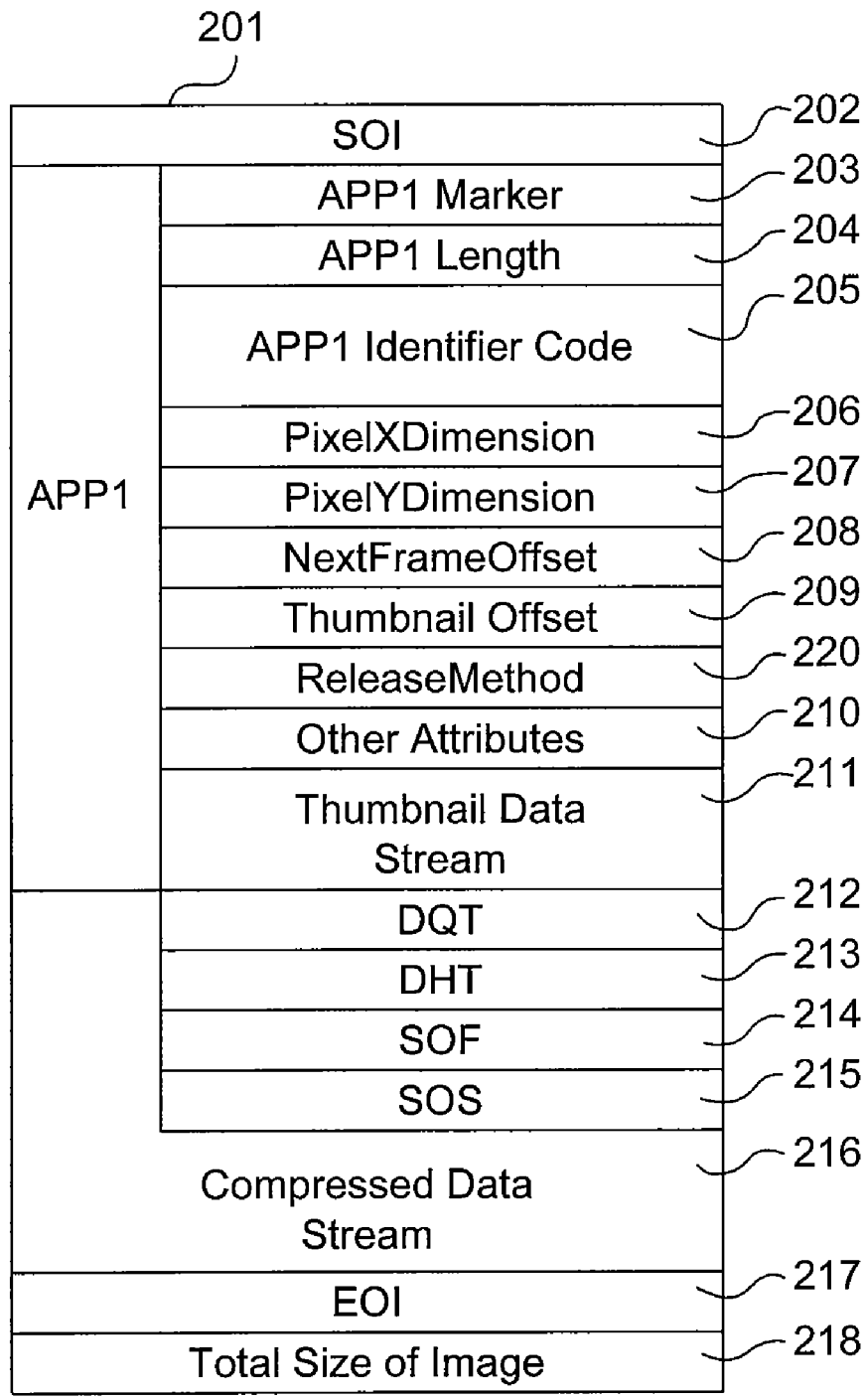
FIG. 2 is a diagram showing an exemplary data structure of an image file in accordance with an embodiment of the present invention.
Figure 4:
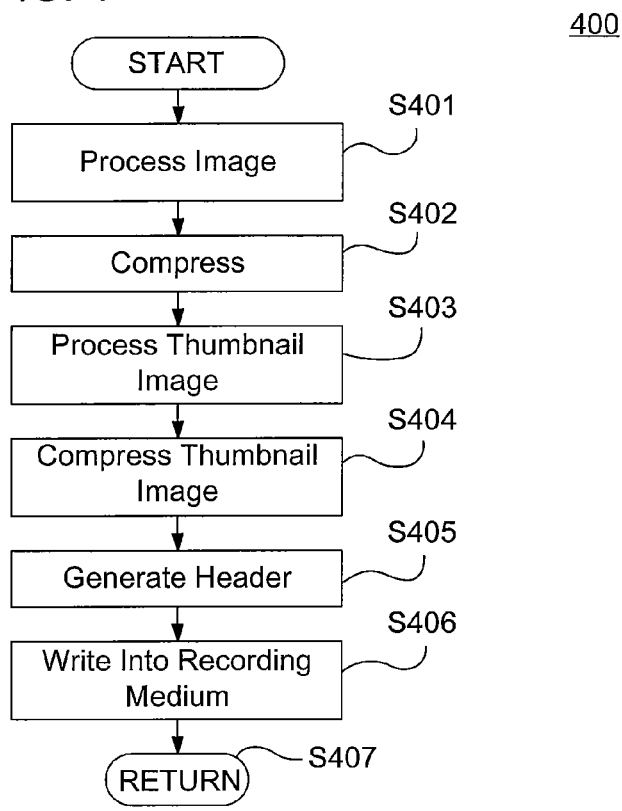
FIG. 4 is a flowchart showing a process for recording digital data in accordance with an embodiment of the present invention.

FIG. 2 depicts a data structure 201 specification stipulating the method of recording image data in a file in accordance with the process depicted in FIG. 4. Each page of the file employs the same data structure 201. The file format consists of one (in still mode) or more than one (in movie or continuous mode) blocks of data referred to as pages. Each page corresponds to one photographic frame. Where there are plural pages, they are arranged one after another in the file. Accordingly, the arrangement of digital data in a file recorded using any mode is the same. In other words, a file recorded in accordance with the present invention uses a single file format. Thus, FIG. 2 shows, by way of example, the internal structure of a file having a single page, written in storage medium 200 in the digital camera 100.

As shown in FIG. 2, the image file header of a page begins with a "Start of Image" or SOI marker 202 and ends with a "Total Size of Image" 218 following an "end of image" or EOI marker 217. Generally, in each mode, each page stores the image information twice: first as thumbnail data stream ("Thumbnail Data Stream") 211 and a second time as a JPEG-compressed data stream ("Compressed Data Stream") 216.

The image file header further includes an APP1 marker 203 for identifying an application area, followed by the size of the APP1 segment "APP1 Length" 204 for indicating the application area size. A code identifying the APP1, "APP1 Identifier Code" 205, is also included. More particularly, APP1 Identifier Code 205 identifies the intended interpretation of a file having an arrangement of data in accordance with the present invention. APP1 identifier Code 205 is followed by PixelXDimension 206 and PixelYDimension 207, which in combination indicate the size of the image to be generated.

Also included in the image file header is NextFrameOffset 208, which indicates either the position of a next page or that no additional pages are stored in a file. If no additional pages are in the file, NextFrameOffset 208 is set to "0". If searching for the next page in a file in the forward direction from the top page (e.g., page 1, page 2, page 3, etc.) it is possible to quickly access the top (i.e., SOI) of the next page by using NextFrameOffset 208. The image file header also includes the start position of the thumbnail data, "Thumbnail Offset" 209. Additional information obtained during image shooting is stored in area 210 (Other Attributes), described in more detail below with reference to FIG. 5.

ReleaseMethod 220 stores data representative of whether the camera 100 is in still, continuous or movie mode. When the operation mode switch 27 is set to still mode, ReleaseMethod 220 is set to a corresponding "still mode" value.

Upon completion of formation of the file header, file section 20 sets the size of a page, "Total Size of Image" 218, indicative of the size of the entire page of data being arranged in accordance with the digital data structure 201. If searching for the top of the same page in a file in the backward direction from the end page (e.g., page 100, page 99, page 98, . . . , if the total number of pages is 100), it is possible to quickly access the top of a page using Total Size of Image 218. In this manner it is possible quickly to access the SOI 202 of the same page by jumping backward by the value (i.e., size of the page) in Total Size of Image 218. The foregoing also provides advantages when editing still images (e.g., combining multiple still images).

Figure 5:
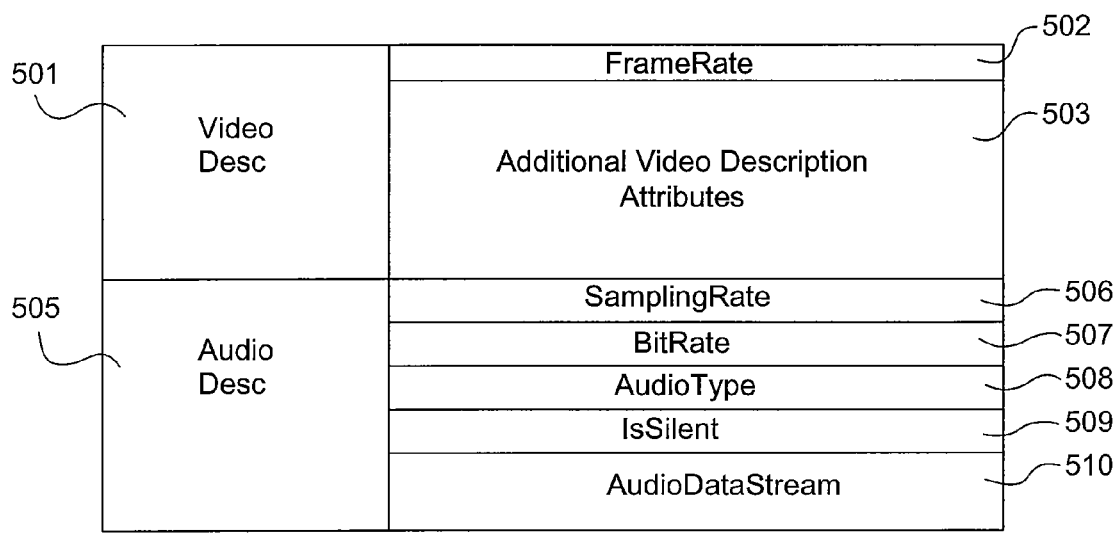
FIG. 5 is a diagram showing, the arrangement of video and audio tags within a data structure in accordance with an embodiment of the present invention.

Referring to FIGS. 2 and 5, an Other Attributes 210 field includes additional information relating to the recording process. In particular, Other Attributes 210 includes a "Video Desc" 501 tag, which defines video attributes such as frame rate, "FrameRate" 502, indicating the period of image frame reproduction, as well as and other movie mode related data, referred to as Additional Video Desc Attributes 503. A predetermined value, e.g., one second, may be set in the FrameRate 502 field, so that the reproducing device for reproducing the image file 201 performs a display control corresponding to the value described in the FrameRate 502. Additional video description attributes 503 are included for controlling playback.

Audio description tag "Audio Desc" 505 is also included in the additional information area, Other Attributes 210, to add information related to the properties of digital audio data. The Audio Desc tag 505 contains audio data, "AudioDataStream" 510, input through microphone 10. If the mode is in still mode then a predetermined sound clip may be stored in AudioDataStream 510. Alternatively, the user may create and store a recording in AudioDataStream 510 after image capture has been placed. Still further, a user can create and store a sound recording before an image has been captured. Once an image has been recorded, the previously stored recording can be copied in or moved to AudioDataStream 510.

Audio Desc tag 505 further contains audio parameters composed of the sampling rate, "SamplingRate" 506 for containing data representing the rate at which samples of audio signals are made, bit rate, BitRate 507, for containing data representing the sound quality, and the type of audio data "AudioType" 508 containing whether the audio is recorded in monaural or stereo.

In all modes, the user may turn audio recording on or off. When audio recording is on, the sound at the time the still image, continuous mode images, or movie image, are being taken, is recorded via a microphone. A predefined audio clip can be used in place of a recorded sound. In addition, the audio data region may be filled with data equating to silence. As a result, the predefined "silence" audio clip is stored in the audio data region, AudioDataStream 510, and a silence flag "IsSilent" 509 is set.

AudioDataStream 510 can be reproduced by a reproducing device in synchronization with the reproduction of the compressed data. However, when the silence flag "IsSilent" 509 is set, the audio data 510 is not reproduced.

The image recording process is triggered when a user presses shutter button 26. This causes image-sensing element 22 to convert one or more optical images to analog signals, which in turn are converted into digital image data by A/D converter 23. The digital image data from A/D converter 23 are temporarily stored in memory 32.

The digital image data stored in memory 32 is then processed by the routine shown in FIG. 4. Initially, at step S401, processor 24 performs image processing operations on the digital data stored in memory 32. The image processing functions relate to brightness, contrast, chromaticity, hue, color temperature, contour emphasis, and the like. After processing the resultant data is stored again in memory 32. In step S402, system controller 17 causes compression/decompression unit 16 to perform JPEG compression coding operations on the processed image data. The resultant data, when arranged into a file, is contained in compressed data stream 216 of digital data structure 201. Markers associated with the compressed data stream are stored in fields 212-215. These markers include a quantization table DQT 212, Define Huffman Table ("DHT") 213, Start of Frame ("SOF") 214 and Start of Scan ("SOS") 215.

After the compressed data is generated, in step S403, the system controller 17 causes the image processor 24 to perform an image-size conversion on the still image data which was processed in step S401, in order to generate a smaller version of the image, i.e., a thumbnail image. In step S404, the thumbnail image is then JPEG compressed and the compressed thumbnail image is stored in memory 32. The resultant thumbnail data is stored in thumbnail data stream 211 of digital data structure 201. Subsequently, in step S405, file section 20 generates an image file header based on the conditions under which the image is taken, which also are stored in a file in accordance with digital data structure 201.

When the above-described processing is complete, the process proceeds to step S406 in which the file section 20 opens a file according to a predetermined file name generated by file administration unit 29, and sequentially records in storage medium 200 a file header 202 to 210, Thumbnail Data Stream 211, Compressed Data Stream markers 212-215, compressed data stream 216, EOI marker and Total Size of Image 218. The recording of the still image is finished when the file is closed.

While the foregoing describes the operation performed when the operation mode switch 27 is set to still mode, the following description explains the operation performed when the operation mode switch 27 is set to the continuous mode. In continuous mode, pressing and holding image shooting button 26 will continuously capture plural successive photographic frames. The recording sequence for recording each still image is the same as that described above with reference to FIG. 4.

Figure 3:
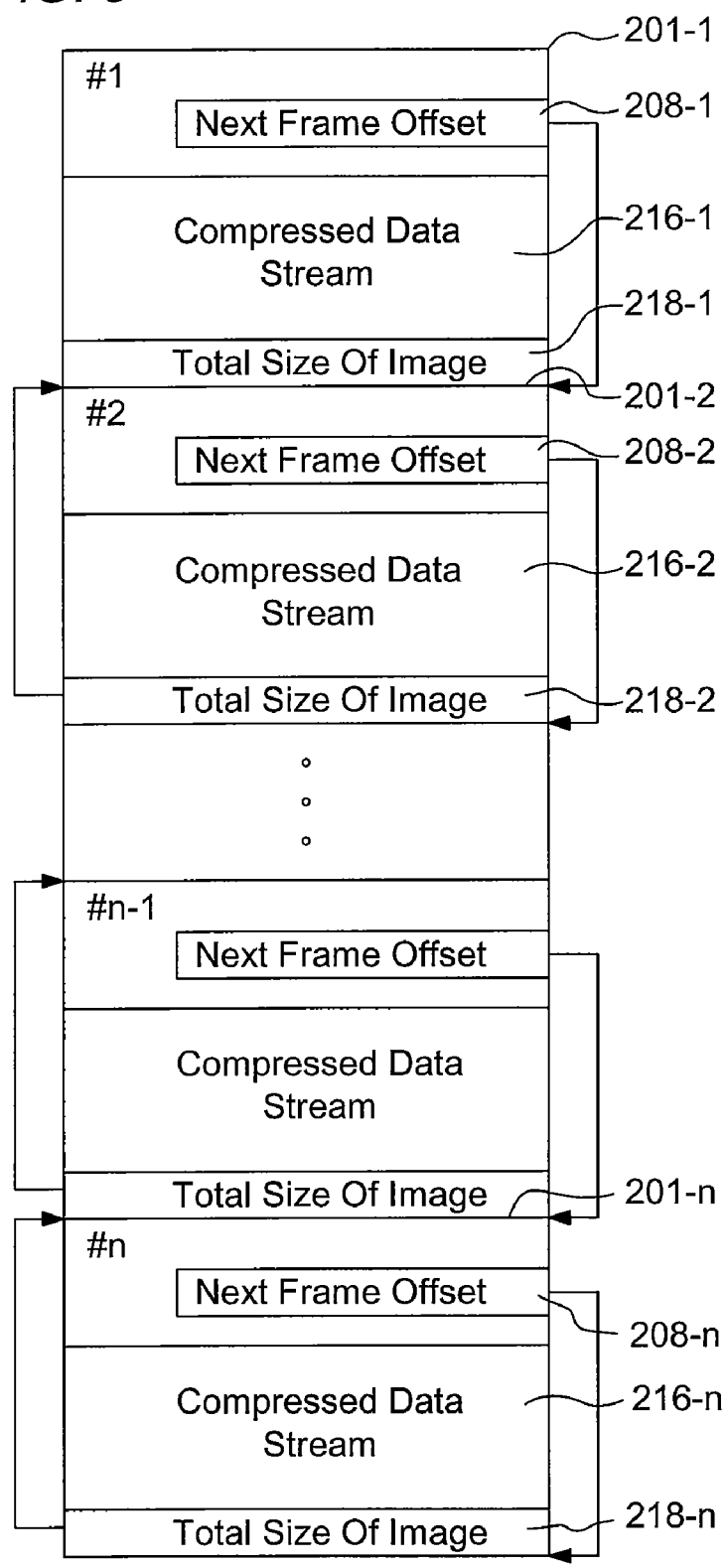
FIG. 3 is a diagram showing an example of the internal structure of a file written in a recording medium in accordance with an embodiment of the present invention.

FIG. 3 shows, by way of example, the internal structure of a file written in storage medium 200 mounted in the digital camera 100. Each one of the pages 201-1, 201-2 to 201-*n* corresponds to the data structure 201 shown in FIG. 2. FIG. 3 shows only a portion of the data an attributes of data structure 201. However, it should be understood that the data structure of the image data generated for each still image recorded in continuous mode is the same as that of the data structure 201 shown in FIG. 2.

In the continuous taking mode, the header of the first page 201-1, corresponds to the first frame (#1). Page 201-1 includes compressed data stream 216-1, a thumbnail data stream 211 (not shown) as well the other attributes (not shown) defining the structure according to 201. The size of this information determines where page 201-2 corresponding to a second frame (#2) begins. In particular, the size indicates an offset attribute, NextFrameOffset 208-1 in page 201-1, representing the position of page 201-2. The size of each page is determined based on the compressed data 216-1, the thumbnail image data 211 and associated attributes, and is stored in the region defined by Total Size Of Image 218-1.

Upon recording Total Size of Image 218-1, file section 20 opens a predetermined file to commence the recording of page 201-1. The system controller 17 operates to enable shooting for the second frame, simultaneously with the commencement of the writing of page 201-1, whereby page 201-2 for the second frame image is generated at a position different from that of the image file 201-1. Thus, the shooting operation and the recording operation proceed in parallel. In addition, ReleaseMethod 220 attribute is set to a value indicating that camera 100 is set to continuous taking mode.

The recording process in the continuous taking mode continues in parallel with the shooting operation as described above, for as long as shutter button 26 is kept pressed down. When a release of shutter button 26 is detected, system controller 17 terminates the shooting and recording operations. It should be noted, however, that image data which has been recorded in memory 32 up until the time shutter button 26 is released is written in storage medium 200. When the final page 201-n corresponding to the last image frame is recorded, a "0" value is recorded in the field NextFrameOffset 208-n of the last page 201-n.

Once the image data has been written, file section 20 closes the file that was opened for the recording, whereby the operation for recording images in storage medium 200 is completed.

Other attributes related to the continuous taking mode are also stored in accordance with data structure 201. In particular, Video Desc 501 tag data including the actual frame rate of successive image frames, FrameRate 502, and other information 503 are set. Similarly, it is possible to insert audio information into the Audio Desc 505 tag.

When the operation mode switch 27 is set to movie mode, image shooting is triggered in response to pressing shutter button 26. A movie image of a predetermined frame rate is continuously recorded until shutter button 26 is pressed again.

The file forming process in the movie image taking mode is the same as that in the continuous taking mode described above. Namely, a file for a movie image is formed by sequentially arranging pages corresponding to successive image frames, and the process for forming each page is identical to that for the recording of a still image described before in connection with FIG. 4. In this case, however, a value indicating movie mode has been chosen is set in a ReleaseMethod 220.

Referring again to FIG. 3, a movie mode recording process will now be described. When the header of the first page 201-1 corresponding to the first image frame (#1) is formed, the position where the next page (e.g., page 201-2) corresponding to the second frame (#2) begins is determined based on the size of the compressed data 216-1, thumbnail image data 211 and associated attributes. A value representing the start position of a subsequent page is stored in NextFrameOffset 208-1 in the first page 201-1. At the same time, the total size of a page is determined and stored in Total Size Of Image 218-1.

When recording has completed, a file is opened to commence the recording of the first image page 201-1 corresponding to the first frame. The system controller 17 writes successive frame data when a predetermined number of data corresponding to, for example, one second (30 frames in case of 30 fps) has been accumulated. In the meantime, the shooting operation continues at the recording frame rate in parallel with the recording operation. A value indicating that the camera 100 is in movie mode is set in ReleaseMethod 220.

The recording process in movie mode is continued while performing the shooting operation and the recording operation in the parallel manner. System controller 17 terminates the shooting operation and the recording operation when the shutter button 26 is pressed a second time. Image data that has already been recorded in memory 32 after a movie mode shooting operation is terminated is written in storage medium 200. When the final image file 201-n is recorded, a "0" value is stored in the NextFrameOffset 208-n of the final image page 201-n.

Upon writing of all the image data, file section 20 closes the file opened for the recording, thereby completing the recording operations images.

Video Desc 501 tag attributes such as FrameRate 502 also are set in movie mode. For example, a predetermined frame rate, e.g., 1/30 second, is set in FrameRate 502. When a reproducing device performs a reproducing operation, the rate is defined by the value set in FrameRate 502. It is also possible to insert Audio Desc 505 data as described above with respect to continuous mode.

A still image can be recorded during the recording of a movie image, by pressing the shutter button 26. When a shutter button 26 activation is detected during recording of a movie image, the operation for recording the movie image is temporarily suspended, and a still image is taken followed by the processing for recording the still image. In this case, the number of pixels forming the still image may be different from that of the frame images recorded in the movie image. The size of the still image is recorded in PixelXDimension 206 and PixelYDimension 207.

System controller 17 inserts the still image page 201 corresponding to a still image frame to a position immediately following the last page generated before the recording of the movie image was suspended. A value corresponding to the period from the moment at which the recording of the movie image is suspended until the moment at which the recording of the still image is completed is stored in the NextFrameOffset 208 field to indicate the position where a movie image frame begins following the still image page 201. Thereafter, the movie image recording is restarted in accordance with the same parameters as those used before the suspension. Movie image frames are arranged and recorded to trail the end of the still image region. It is thus possible to insert into a movie image file a still image frame having a different frame rate and recording pixel values from those of the frames constituting the movie image file.

Figure 6:
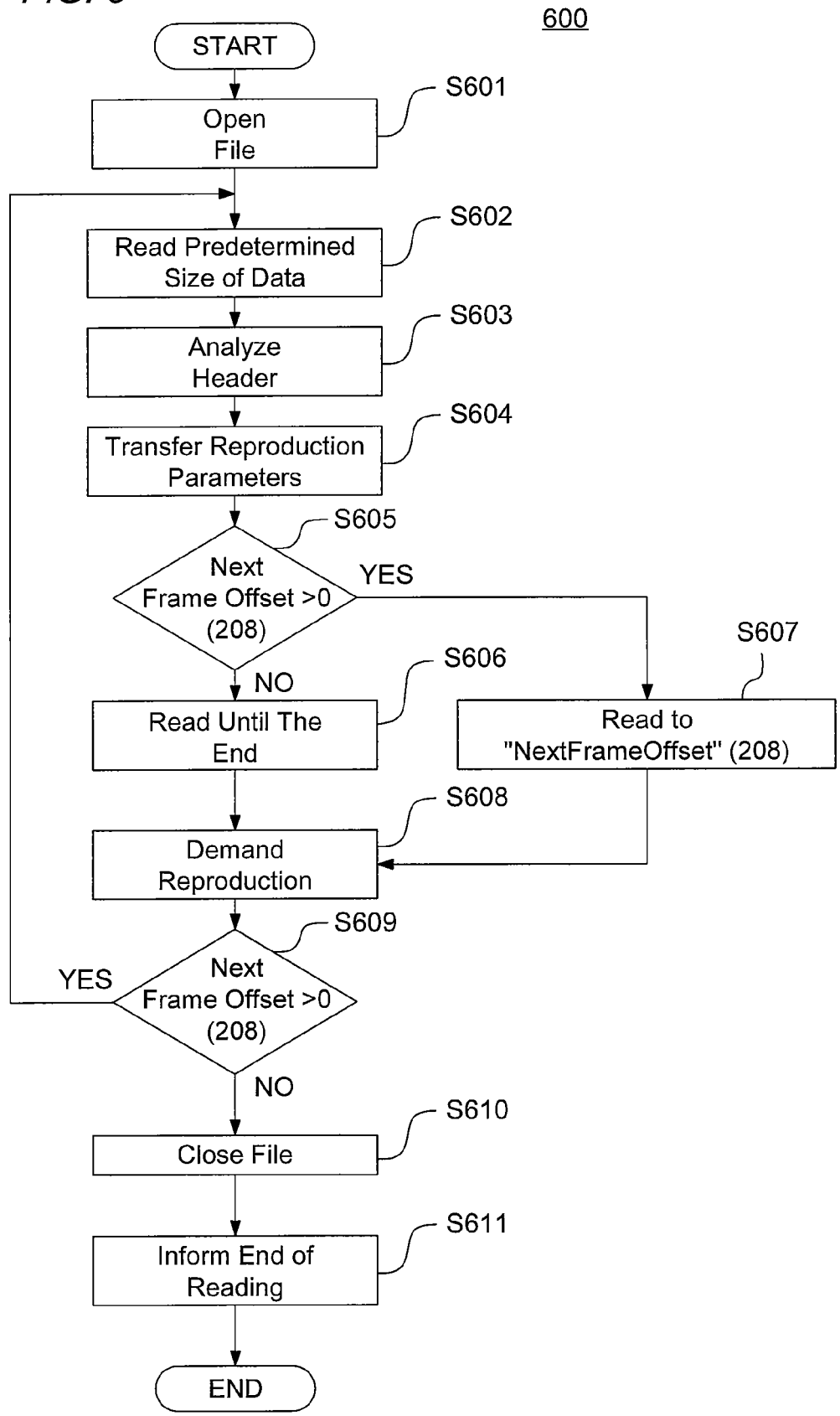
FIG. 6 is a flowchart showing a process for reading a file in accordance with an embodiment of the present invention.
Figure 7:
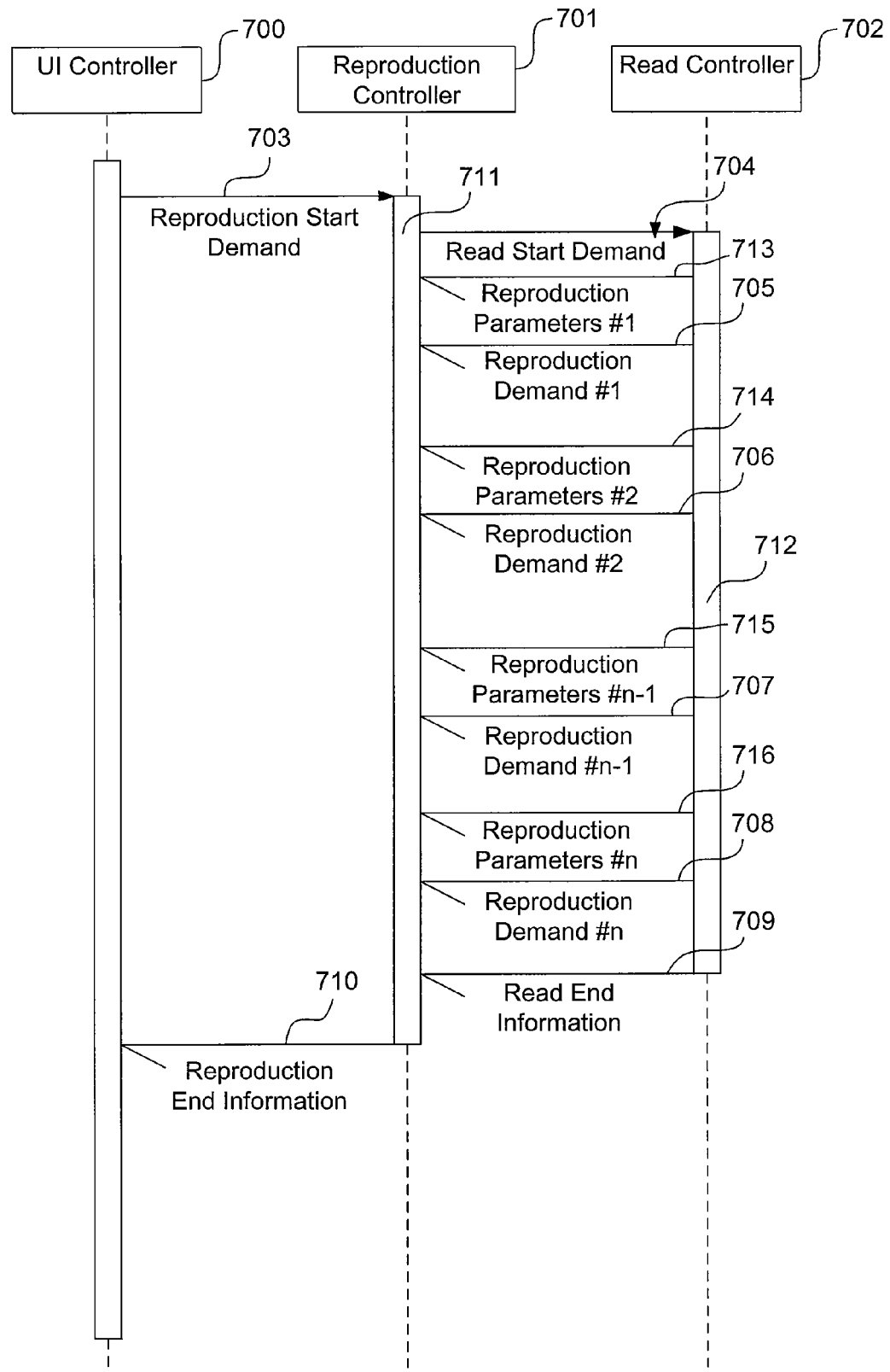
FIG. 7 is a diagram showing an example of a reproduction processing sequence performed in accordance with an embodiment of the present invention.

The routine for reproducing images recorded in the manner described heretofore will now be described with reference to FIGS. 6 and 7. FIG. 6 is a flowchart showing the process 600 performed by system controller 17 for reproducing an image file 201 stored in storage medium 200. FIG. 7 shows an example of the reproduction processing sequence. The process and sequence are performed when operation mode switch 27 is set to a reproduction mode.

System control section 17 includes a user interface (UI) controller 700, a reproduction controller 701 and a read controller 702. Since each page of an image recorded in accordance with the present invention is independent of another page recorded in a file, reproduction controller 701 and read controller 702 can operate in parallel. Thus one page can be reproduced while another page is being read. Initially, UI controller 700 sends a reproduction start demand 703 to a reproduction controller 701, in order to commence the reproduction of an image recorded in accordance with the present invention. Upon receipt of the reproduction start demand, reproduction controller 701 generates a reproduction control task 711 which in turn communicates a read start demand 704 to read controller 702.

Upon receipt of the read start demand 704 from the reproduction controller 701, read controller 702 generates a read control task 712. The read control task 712 will now described in more detail with reference to FIG. 6.

Referring to FIG. 6, after forming a read control task 712, at step S601 the read controller 702 opens a user selected file in storage medium 200. Next, read controller 702 reads data of a predetermined size from storage medium 200 into memory 32 in accordance with the "APP1 Length" 204 specified in the header portion of the page, as shown in step S602. The "APP1 Length" 204 corresponds to the size of each page.

In step S603, read controller 702 analyzes the header portion of the page read into memory 32 to extract the reproduction parameters 713 of the first page of the file which are necessary to display an image frame. Reproduction parameters 713 include image size information such as PixelXDimension 206 and PixelYDimension 207, and NextFrameOffset 208 which indicates the position of the next image file 201, as well as the FrameRate 502 and audio information stored in Audio Desc 505.

In step S604, reproduction parameters 713 are transferred to reproduction controller 701. In step S605, reference is made to NextFrameOffset 208 to determine whether the value written therein is greater than "0". If the value set in NextFrameOffset is greater than "0", i.e., if the answer is "Yes" in step S605, the process proceeds to step S607, which reads NextFrameOffset into memory 32. Then, in step S608, a reproduction demand 705 is communicated to reproduction controller 701.

At step S609, a determination is made whether the value in NextFrameOffset 208 is greater than "0". If not, then process 600 advances to step S610. Conversely, if the value is greater than "0", i.e., when "Yes" is the answer in step S609, the process returns to step S602. Thus, when the value set in NextFrameOffset 208 is not "0", the process returns to step S602 to continue the read processing for reading the next page corresponding to the next image frame. The read processing continues until the value in NextFrameOffset is reduced to "0".

When the value in NextFrameOffset 208 is determined to be "0" in step S605, i.e., when the answer is "No" in step S605, the process advances to step S606 in which the file is read to its end. In this case, step S606 reads the final frame which corresponds to the image file 201-n shown in FIG. 3. Next, step S608 is executed, in which a reproduction start demand 708 is communicated to the reproduction controller 701.

The file is closed in step S610 after the last page is read and read controller 702 communicates a message to reproduction controller 701 informing it that the read operations have ended, as shown in step S611, whereby the reading operation of data from storage medium 200 is completed and the reproduction control task 711 is dismissed. Reproduction end information 710 is communicated to UI controller 700 by reproduction controller 701 also indicating that the reproduction has ended.

The image data read out through the above mentioned process is reproduced by the following process. As described above, in step S608, the reproduction controller 701 receives a reproduction demand (705, 706, 707, or 708). In response to this demand, the compression/decompression unit 16 performs decompression of the data using the reproduction parameter (713, 714, 715 or 716) and the compressed data 216 stored in memory 32. Image processor 24 resizes the image data to a size suitable for the display on the image display unit 14. The image data thus processed is again stored in memory 32 and the resized image data is displayed on the image display unit 14.

Upon receipt of a read end information message 709 from read controller 702, reproduction controller 701 dismisses the reproduction control task 711 after processing of all the pages designated by the reproduction demand, and informs the UI controller 700 that reproduction has completed by communicating to it a completion of reproduction message 710.

The reproduction demands (705, 706, 707, and 708) and the reproduction parameters (713, 714, 715, and 716) which are successively transferred from read controller 702 are stored in system memory 31 and reproduction processing is performed in accordance with the parameters, under the control of the reproduction controller 701. The reproduction processing is conducted until an read end information message 709 is issued from the read controller 702.

The reproduction controller 701 also analyzes the silence setting, IsSilent 509, of the audio information, AudioDesc 505, in the reproduced page. If IsSilent has not been set, the reproduction controller 701 causes audio controller 11 to reproduce audio data stored in memory 32 in accordance with the audio parameters such as the sampling rate 502. The audio signals are then fed to speaker 39. If the silence has been set, the described audio reproduction processing is not performed.

As will be understood from the foregoing description, the illustrated embodiment makes it possible to record image data with a common data structure, regardless of which image taking mode is selected. The recorded data contains, at least a value indicating the taking mode, ReleaseMethod 220, and the offset value, NextFrameOffset 208. With these values, it is possible to determine during a reproducing operation whether subsequent image data exists. When the recorded image data further contains information concerning the reproducing period, e.g., frame rate, it is possible to accurately reproduce movie image scenes.

As described in more detail below with respect to the PC software, because camera 100 produces only one format, the PC software must perform conversions on that format to allow the user to view a movie or sets of frames recorded in continuous mode. While a standard viewer may be able to view a frame in each mode (i.e., the single frame of a still picture, or the first frame of continuous set of pictures or of a movie), the file must be converted by the PC application in order to view the remaining frames of a continuous set of frames or of a movie.

Another embodiment of the single file format of the present invention will now be described. The file format consists of one (in still mode) or more than one (in movie or continuous mode) blocks of data referred to as EXIF pages. Each page corresponds to one photographic frame. Where there are plural pages, they are arranged one after the next in the file. In the following embodiment, each page is structured to be compliant with the EXIF standard which is further limited by the DCF standard.

As explained above, the DCF standard specifies rules which add limitations to the EXIF standard for the sake of playback compatibility. In particular, the DCF standard defines how an image is stored and its filename extension. An image file or "DCF Basic File" is stored under a DCF directory, has a DCF filename and extension, and as mentioned above, a data structure in compliance with the EXIF standard. Image data in a DCF Basic File is compressed using the JPEG-compression algorithms, where the JPEG compression used is lossy.

Each page can be extracted and named in accordance with the DCF standard and saved as a DCF Basic File. Such extraction and renaming processes are performed using a PC application as described in more detail below.

In all modes, the user may turn audio recording on or off. When audio recording is on, the sound at the time the still image, continuous mode images, or movie is being taken is recorded via a microphone. A predefined audio clip can be used in place of a recorded sound. Whether still mode, continuous mode, or movie mode is selected, and whether or not audio recording is turned on, a single file is stored on the memory card. For illustration, the ".JPG" extension is used herein.

Figure 8:
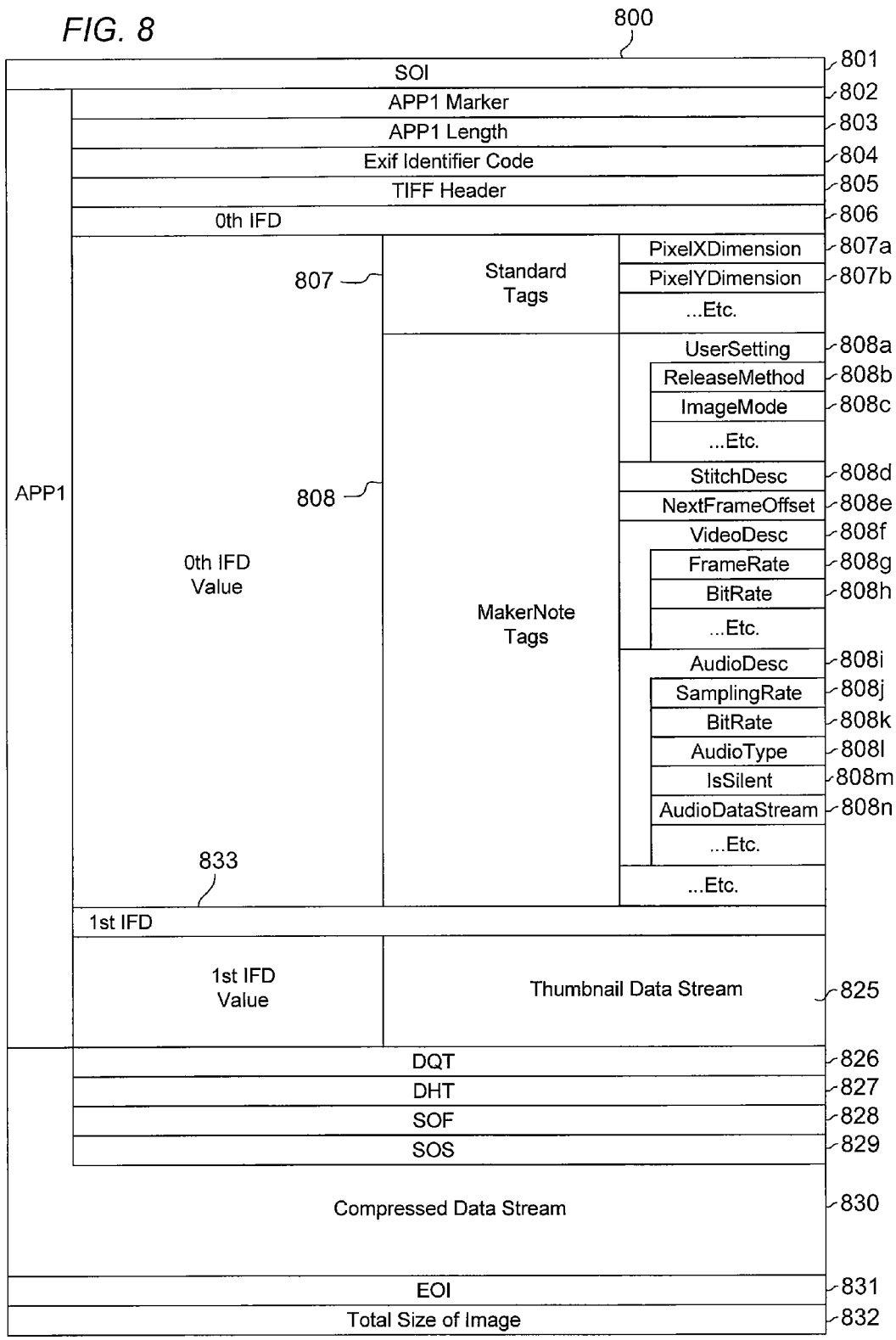
FIG. 8 is a diagram showing an exemplary data structure of an image file in accordance with an embodiment of the present invention.

The data structure specification illustrated in FIG. 8 stipulates in more detail the method of recording image data in a file. Each page of the file employs the same data structure 800. Whether still, continuous, or movie mode is selected, each page has the same structure.

Referring to the data structure in FIG. 8, in this embodiment each page begins with a "start of image" or SOI marker 801 and ends with a "Total Size of Image" 832 following an "end of image" or EOI marker 831. Generally, in each mode, each page stores the image information twice: first as thumbnail data stream ("Thumbnail Data Stream") 825 and a second time as a JPEG-compressed data stream ("Compressed Data Stream") 830. Furthermore, in each mode, each page has the same tags in the same order, namely (a) the Standard Tags 807 used in a DCF Basic File, (b) MakerNote Tags 808, and (c) InteroperabilityIFD Tags (not shown). For a more detailed description of Interoperability Tags see Japan Electronic Industry Development Association (JEIDA), "Digital Still Camera Image File Format Standard (Exchangeable image file format for Digital Still Cameras: EXIF) Version 2.2", April 2002, incorporated herein by reference.

As shown, APP 1 consists of an APP 1 marker 802 for identifying an application area, a length code (APP 1 Length) 803 for indicating its size, an EXIF identifier code 804, and a TIFF header 805. The data structure further includes two image file directories (IFDs), namely the 0th IFD 806 and the 1st IFD 833. The 0th IFD 806 records information concerning the image and the 1st IFD 833 is used to record a thumbnail image (i.e., the Thumbnail Data Stream 825). Standard Tags 807, MakerNote Tags 808 and InteroperabilityIFD Tags within the 0th IFD 806 will now be described in more detail.

The Standard Tags 807 include PixelXDimension 807(a) and PixelYDimension 807(b), which reflect the width and height of the Compressed Data Stream 830 in pixels.

As with the Standard Tags 807, the MakerNote Tags 808 are also present in each page, whether still, continuous, or movie mode is selected. These tags include (1) UserSetting 808(a), (2) StitchDesc 808(d), (3) NextFrameOffset 808(e), (4) VideoDesc 808(f), and (5) AudioDesc 808(i).

UserSetting 808(a) includes ReleaseMethod 808(b) and ImageMode 808(c). ReleaseMethod 808(b) stores data representative of whether the cameras are in still, continuous or movie mode. ImageMode 808(c) contains data representative of the scene mode, such as auto, portrait, day or night scene, color, and the like.

StitchDesc 808(d) stores data used for stitching images automatically by means of a PC application (e.g., Photo-Stitch™). NextFrameOffset 808(e) is used to determine the location in the file where the next page begins. NextFrameOffset 808(e) is zero in still mode, whereas in continuous mode and movie mode it points to the location in the file where the next page begins.

As shown in data structure 800, each page includes "NextFrameOffset" 808(e) information. If searching for the next page in a file in the forward direction from the top page (e.g., page 1, page 2, page 3, etc.) it is possible to access the top (i.e., SOI 801) of the next page by using "NextFrameOffset" 808(e). The data structure of each page also includes "Total Size of Image" 832 (after EOI 831) which represents the total data size of a page in which it is included. If searching for the top of the same page in a file in the backward direction from the end page (e.g., page 100, page 99, page 98, . . . , if the total number of pages is 100), it is possible to access the top of a page using "Total Size of Image" 832. In this manner it is possible to quickly access the SOI 801 of the same page by jumping backward by the value (i.e., size of the page) in "Total Size of Image" 832. The foregoing also provides advantages when editing still images (e.g., combining multiple still images).

VideoDesc 808(f) defines video attributes such as frame rate (FrameRate) 808(g) and bit rate (BitRate) 808(k). In still mode, FrameRate 808(g) and BitRate 808(h) can be used to control the playback interval during a slide show. In movie mode, in contrast, they have values corresponding to the frame rate and bit rate characteristics of the movie stored in the file.

AudioDesc 808(i) includes data which collectively indicates whether the page is silent, or which contains the audio data corresponding to that page if audio recording was turned on by the user. In more detail, SamplingRate 808(j) contains data representing the rate at which samples of audio signals are made. BitRate 808(k) contains data representing the sound quality. In particular, it is the amount of information (or bits) that is transferred per second (bits per second or bps): the higher the value of BitRate 808(k), the better the sound quality. AudioType 808(l) represents whether the audio is recorded in monaural or stereo. IsSilent 808(m) represents whether there is any audio data. AudioDataStream 808(n) stores the sound data itself. If the mode is in still mode then a predetermined sound clip may be stored in AudioDataStream 808(n). Alternatively, the user may create and store a recording in AudioDataStream 808(n) after image capture has been placed. Still further, a user can create and store a sound recording before an image has been captured. Once an image has been recorded, the previously stored recording can be copied in or moved to AudioDataStream 808(n).

The Interoperability Tags (not shown) are also included, which point to the EXIF-related interoperability IFD. In particular, the Interoperability IFD tags store information necessary to ensure interoperability between EXIF implementations.

The same tags are present whether still mode, continuous mode or movie mode is selected, although the values associated with those tags may be different.

An advantage of the above-described single file format over conventional cameras is that there is no need to store a separate thumbnail file, which typically would have a THM extension, for each file containing a movie. Instead, the thumbnail from the first page of such a file may be displayed, just as would be done if the file contained a still image and thus a single page. This allows the user to easily browse through a group of files using a conventional file browser on a computer, whether a given file contains a still image or movie.

Another advantage of this single file format over conventional cameras is enhanced printing functionality. Since both still images and movies can be stored as a DCF Basic File in accordance with the DCF standard, the user can connect a DCF-compliant printer directly to the cameras and print the file. In all cases (i.e., still, continuous, and movie mode-generated file), image data from the first page of the file is used. In contrast, a conventional camera that stored a movie using an "AVI" extension would not offer such functionality, because the DCF-compliant printer would not recognize the AVI file and thus could not print an image from the file.

In addition to the audio recording feature that allows the user to store sound such as occurring at the time the still image or movie is taken, camera 100 has a separate sound annotation feature that allows the user to store sound recorded after the still image or movie has already been stored on the removable memory. The user may employ this technique in either still, continuous or movie mode. However, unlike the audio recording feature, the sound annotation feature does not affect the still or movie mode file containing the page or pages; instead, the sound annotation is stored in a separate file. That file is a WAV file having a filename based on the filename of the still mode or movie mode file.

In addition to the sound annotation feature, camera 100 also provides DPOF functionality pursuant to the DPOF standard. This allows the user to specify, for each file, one or more of the following instructions: (1) that the file should be printed, (2) that the file should be transferred from the memory card to another device such as a computer, for storage, and (3) that the file should be automatically played. In all three cases, the user's instructions are stored in files separate from the file that contains the still image or movie. In particular, printing instructions are stored in file named "AUTPRINT.MRK", transfer instructions are stored in a file named "AUTXFER.MRK", and automatic playing instructions are stored in files such as "AUTPLAY0.MRK", "AUTPLAY1.MRK", etc. The file containing the still image or movie is not affected by the user's setting of DPOF instructions.

PC software is used on a personal computer to view or process the files after transfer from the removable memory to the computer. The application provides two main functions, a viewer function, which allows the user to view either the Thumbnail Data Stream or the Compressed Data Stream from a file, and a converter function, which allows the user to convert a file containing plural EXIF pages into an AVI file. The following description of the PC software can operate on image files in accordance with data structure 201 depicted in FIG. 2 or data structure 800 depicted in FIG. 8. For simplicity, the following description of the PC application in accordance with the present invention sometimes refers to the tags or attributes of structure 800. This is not intended to limit the PC application to function solely with data structure 800.

Figure 9:
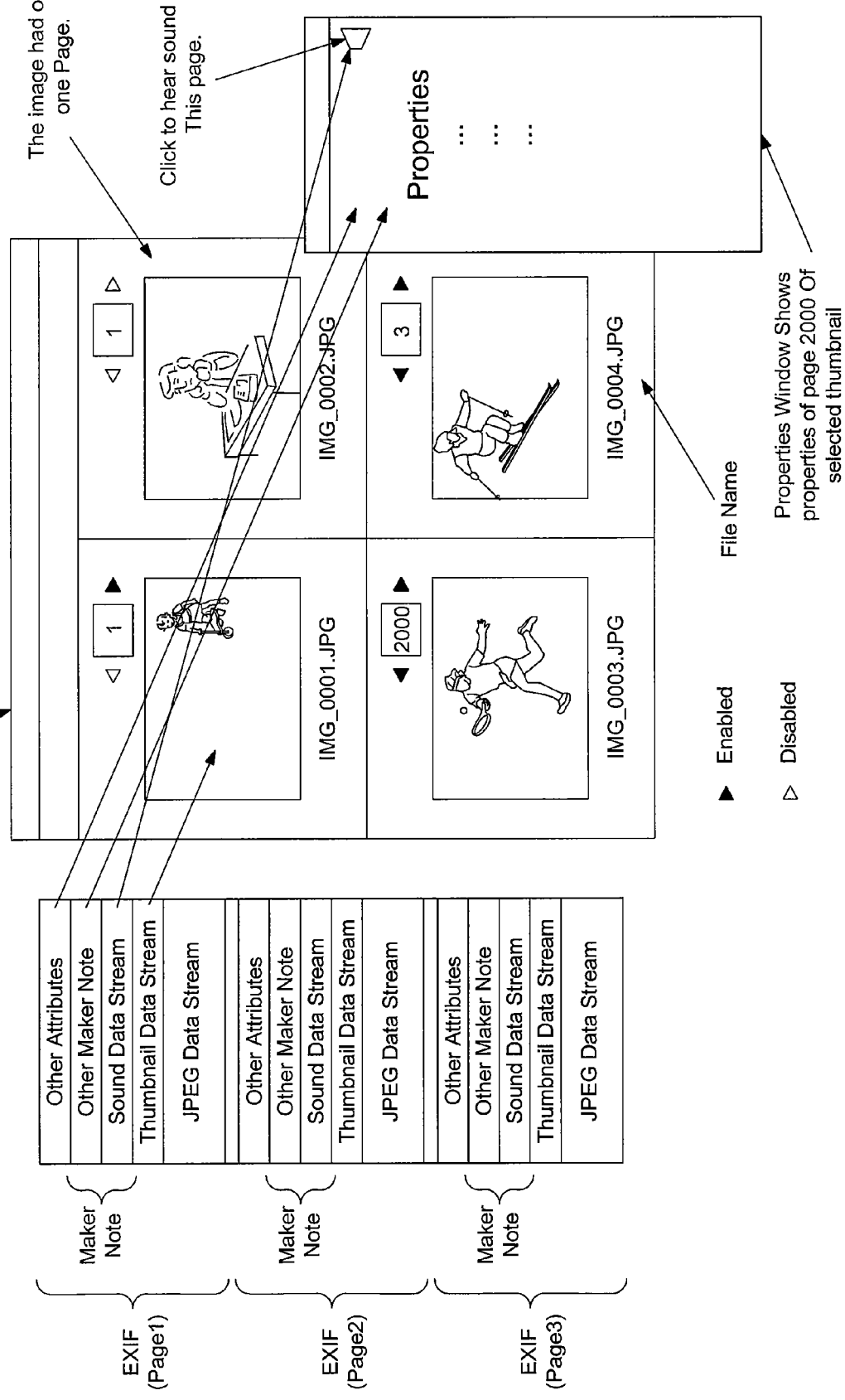
FIG. 9 depicts the relationship between an exemplary data structure of an image file with a screenshot of a thumbnail listing generated by a personal computer (PC) application in accordance with the present invention.

FIG. 9 depicts the relationship between an exemplary data structure of an image file with a screenshot of a thumbnail listing generated by a personal computer (PC) application in accordance with the present invention. As shown in FIG. 9, several Thumbnail Data Streams from different pages of a file can be displayed in a different portion of a screen (e.g., Thumbnail listing Window). In the exemplary screenshot shown in FIG. 9, a properties window can be displayed to show the properties of a selected thumbnail image. As will be described in more detail below, next page and previous page controls for moving through an image file recorded and read in accordance with the present invention are provided.

The viewer function can operate either in a thumbnail listing mode or a full view mode. The thumbnail listing mode displays a Thumbnail Data Stream from a file, whereas the full view mode displays a Compressed Data Stream from a file. In the thumbnail listing mode, the application displays a thumbnail using a process 1000 shown in FIG. 10A.

Initially, at step 1002, the current page is set to "1". At step 1004, the previous and next page controls are disabled. At step 1006, the file name (e.g., "IMG_0001.JPG") is displayed. Next, data is read and parsed from the current page at step 1008. If a determination is made at step 1010 that a field NextFrameOffset 808(*e*) in the MakerNote Tags 808 of the current page is greater than zero, then at step 1012 next page control is enabled. Otherwise, the next page control is not enabled and Thumbnail Data Stream data from page 1 is read and decoded at Step 1014. Step 1014 also occurs after the next page control is enabled (i.e., step 1012). Finally, step 1016 displays the decoded Thumbnail Data Stream from page 1. This results in the display of a thumbnail for the first page of the file. When the application is started up, the viewer function shows the thumbnail of the first page of each file in a user-specified directory by repeating the algorithm.

With further reference to Steps 1010 and 1012, if there are plural pages in the file, then NextFrameOffset 808(*e*) in the MakerNote Tags 808 of the first page of the file will be greater than zero, in which case the next page control is enabled.

Figure 10A:
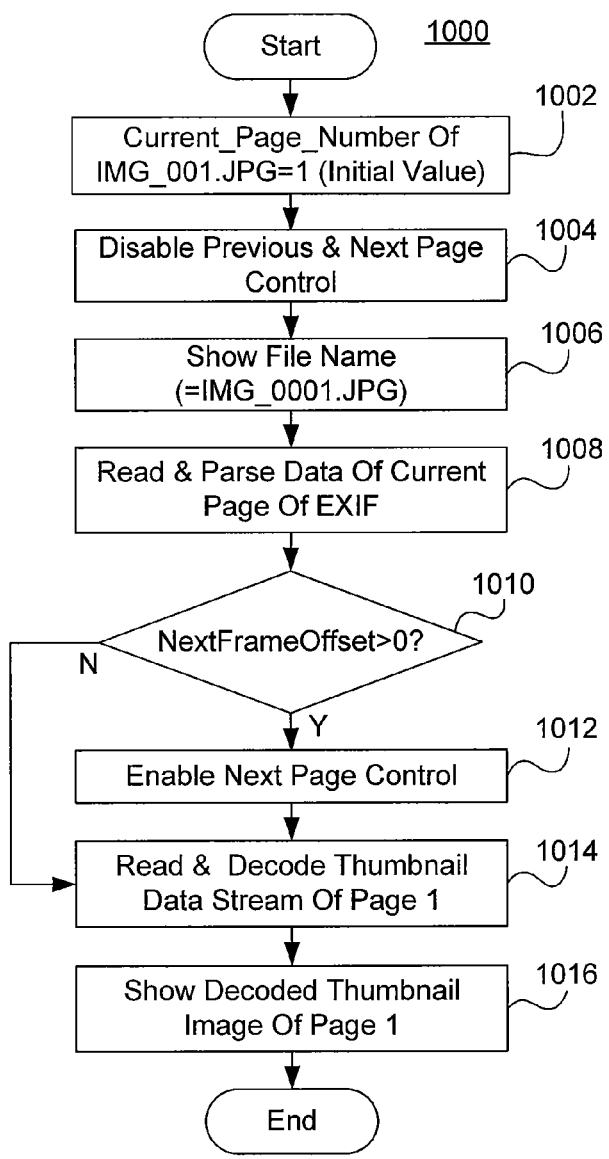
FIG. 10A is a flowchart showing a process for displaying an image thumbnail in accordance with the present invention.
Figure 10B:
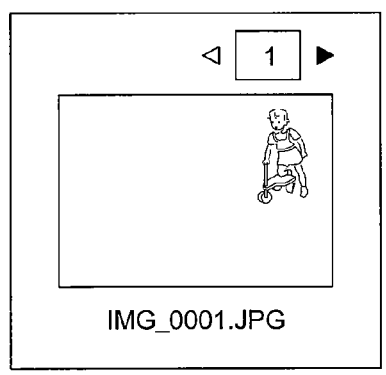
FIG. 10B shows a screenshot of a thumbnail displayed in accordance with the flowchart depicted in FIG. 10A.

FIG. 10B shows a screenshot of a thumbnail displayed in accordance with the flowchart depicted in FIG. 10A. Along with each thumbnail the current page number is displayed, as well as two arrow buttons for the user to specify display of a previous page or the next page, respectively. If a button is filled in, then the user may select it, whereas if a button is grayed out then the user can not select it. For example, as shown in FIG. 10B when the thumbnail of the first page of a file containing plural pages is displayed, the previous page arrow is grayed out, since there is no previous page, whereas the next page arrow is filled in, since the user may select that arrow to display the next page.

If the user selects a thumbnail by selecting it, then a "Properties Window" 1114 displays attributes associated with the selected file by using a process 1100 depicted in FIG. 11A.

Initially, a determination is made at step 1102 whether the thumbnail view of a file is selected. If so, then process 1100 proceeds to step 1104. At step 1104, the frame color of the thumbnail view of the file is highlighted. At step 1106, the status flag of the current file is set to "selected". At step 1108 the current page number for the file is recalled. Step 1110 reads the attributes from the page corresponding to the current page number and at step 1112 attributes are displayed in a Properties Window 1114. Attributes may include, for example, shutter speed. However, not all of the attributes stored in the page are necessarily displayed in the Properties Window 1114. Instead, a subset of the attributes may be displayed. The status flag referred to with reference to step 1106 and the current page number referred to with reference to step 1108 are variables used by the viewer function and are stored separately from the files.

FIG. 12A is a flowchart showing a process for playing an audio stream stored within a file in accordance with the present invention. As shown in FIG. 12B, the Properties Window 1115 contains a speaker-shaped icon. This icon is for playing any audio recording stored in the page. If at step 1202 the user selects that icon, then the viewer function recalls the current page number of the file as shown at step 1204 and reads the audio data stream from the page, as shown at step 1206. If an audio data stream exists, at step 1208, the sound is played.

Having selected a thumbnail, the user may select the next page control or previous page control, if they are selectable.

FIG. 13 illustrates an image file IMG_0001.JPG containing several pages. As shown in FIG. 13, each thumbnail image can be selected to display its properties. In addition audio playback can be accomplished by selected a speaker icon on any of the thumbnail images. If a page exists before or after a particular page, then Next Page Control is enabled or disabled, respectively.

Figure 14A:
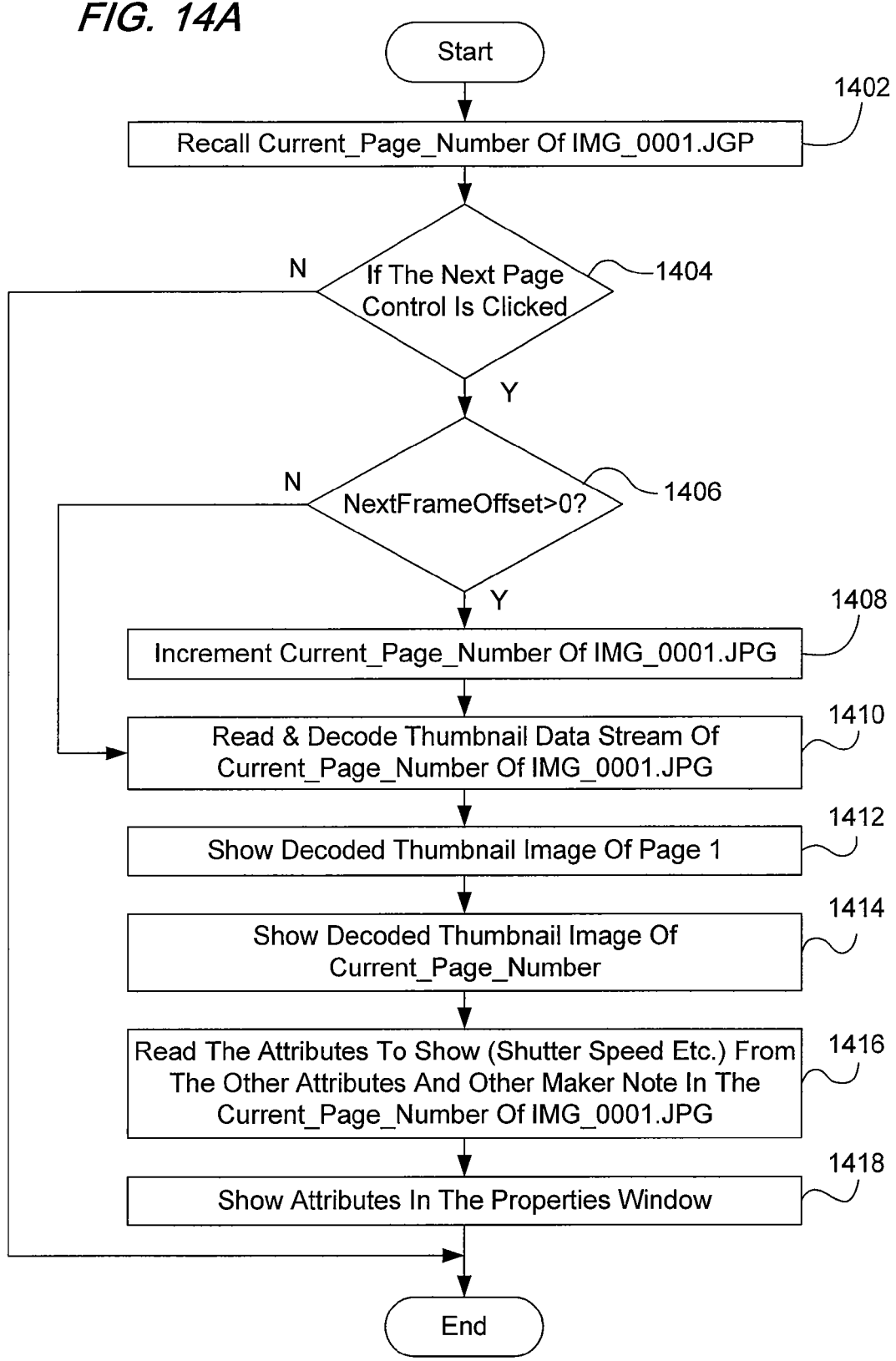
FIG. 14A is a flowchart showing a process for selecting a next page control or previous page control in accordance with the present invention.
Figure 15:
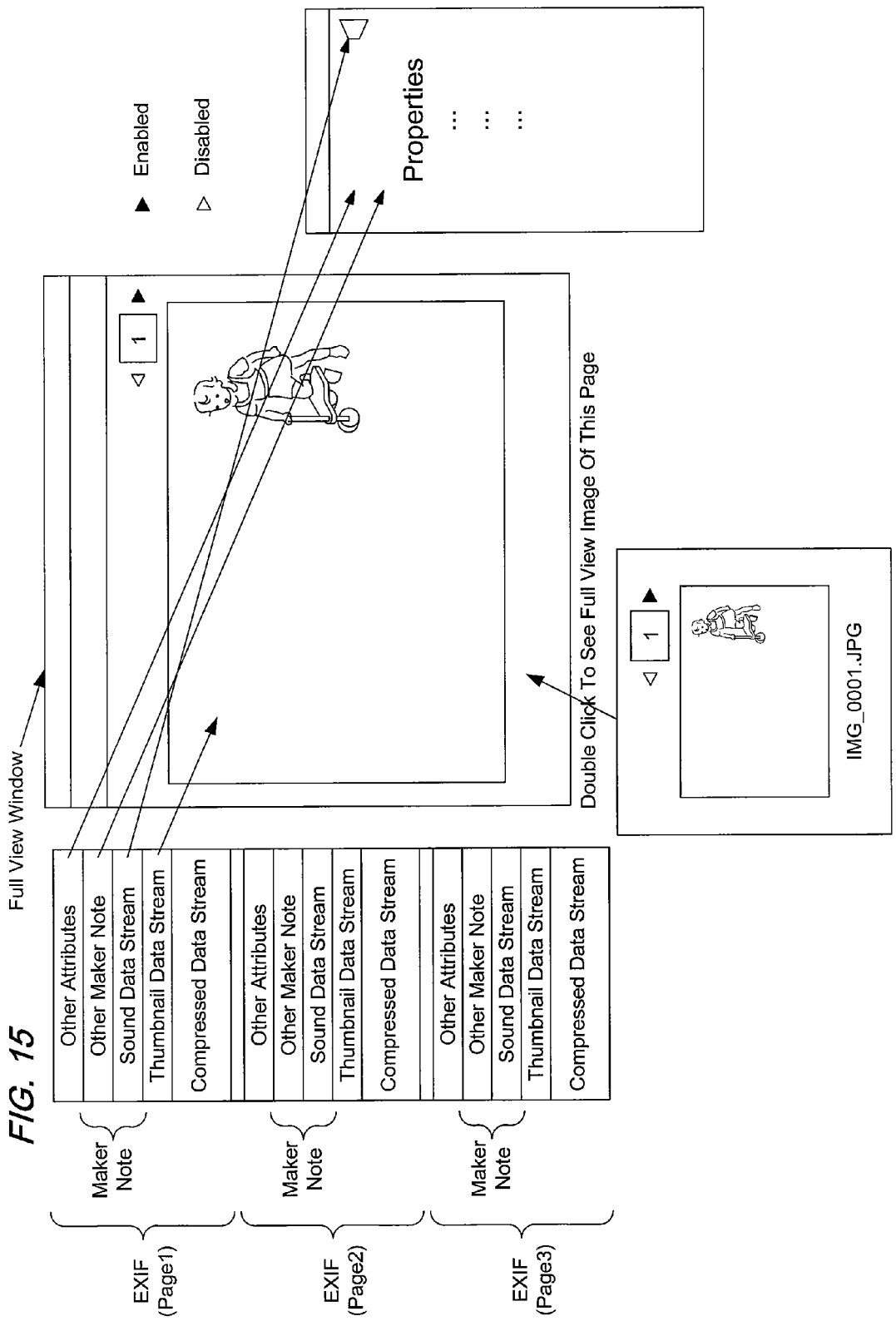
FIG. 15 shows a screenshot of an image shown in full view mode and the attributes of the image, as well as the association of the data structure to the portions of the screenshot.

Process 1400 depicted in FIG. 14A is employed in the case where the next page control is selected. Initially, at step 1402 the current page number of the file is recalled. If a determination is made at step 1404 that the next page control is selected, then the process proceeds to step 1406, where another determination is made whether the NextFrameOffset 808(*e*) field is greater than zero, and if so, process 1400 proceeds to step 1408, which increments the current page number of the file. Next, step 1410 reads and decodes the Thumbnail Data Stream of the current page. Step 1412 displays the decoded Thumbnail Data Stream. Step 1416 reads attributes from the page corresponding to the current page number and step 1418 displays attributes in the Properties Window 1114 as shown in FIG. 14B.

Figure 16A:
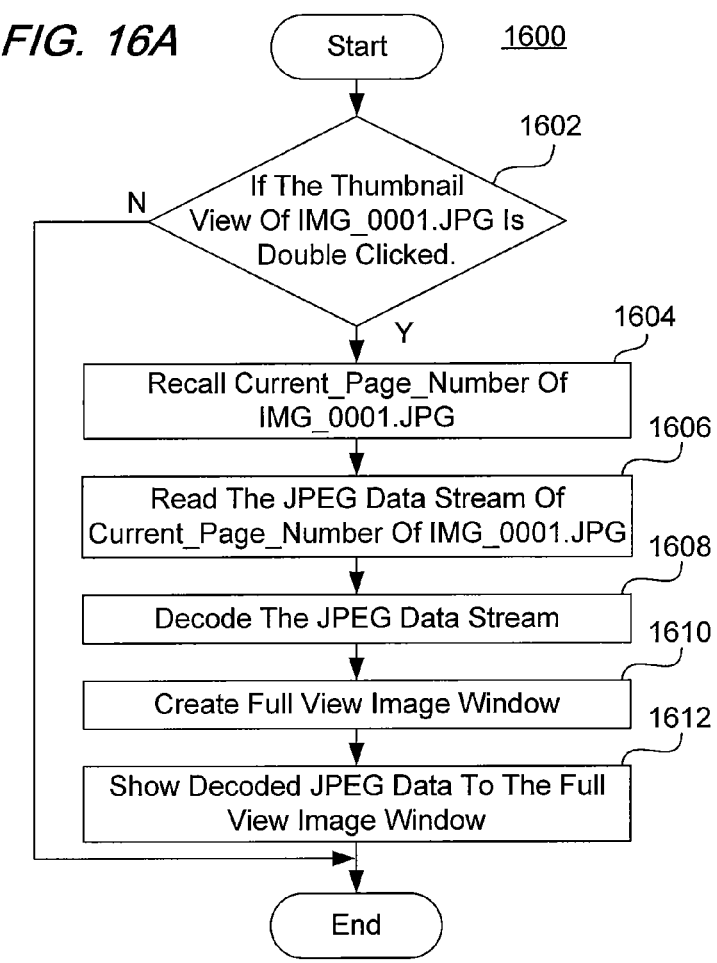
FIG. 16A is a flowchart showing a process for viewing an image in full view mode in accordance with the present invention.

In addition to the thumbnail listing mode, a full view mode may be selected by the user. In the thumbnail mode, the image displayed is obtained from the Thumbnail Data Stream 825, whereas in the full view mode, the image displayed is obtained from the Compressed Data Stream 830. To select the full view mode, the user selects by "double-clicking" on the thumbnail, as shown by a process 1600 depicted in the flowchart shown in FIG. 16A.

Initially, a determination is made at step 1602 whether the thumbnail view of a file has been selected by double-clicking the thumbnail view, and if so, step 1604 recalls the current page number for the file, upon which the Compressed Data Stream of the current page number read at step 1606. Once read, the Compressed Data Stream 830 is decoded, as shown at step 1608. Next, at step 1610, a full view window is created on which the decoded Compressed Data Stream 830 is displayed, as shown at step 1612.

Figure 16B:
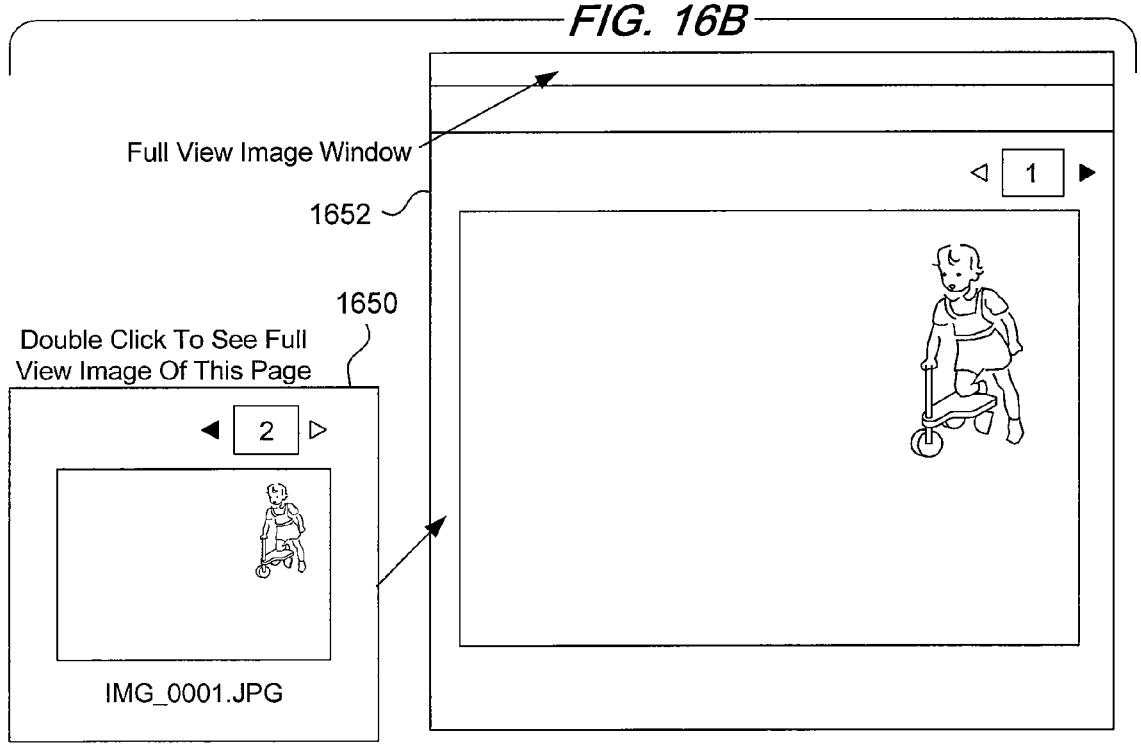
FIG. 16B shows a screen shot of an image displayed in full view mode in accordance with the flowchart depicted in FIG. 16A.

Referring to FIG. 16B, just as a thumbnail image window 1650, the full view image window 1652 displays the current page number and previous and next page controls. As explained above, the previous and next page controls allow the user to move from page to page for the file in a case in which there are plural pages in the file.

Figure 17A:
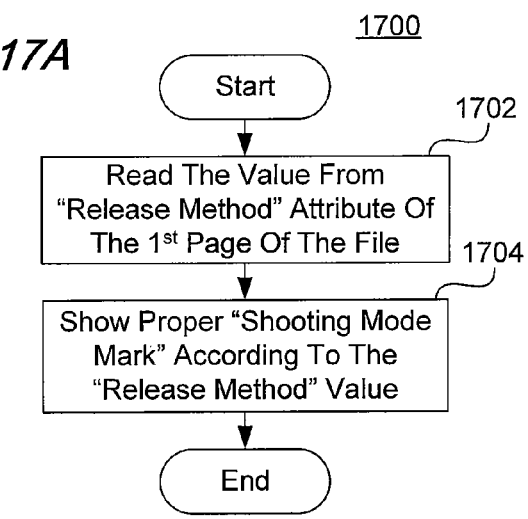
FIG. 17A is a flowchart showing a process for displaying a shooting mode mark on a thumbnail in accordance with the present invention.

When displaying a thumbnail, the viewer function displays a shooting mode mark with the thumbnail so that users can distinguish the shooting mode for the file. FIG. 17A is a flowchart showing a process for displaying a shooting mode mark on a thumbnail in accordance with the present invention. At step 1702 the value of the ReleaseMethod attribute of the first page of the file is read. Next the value of the ReleaseMethod attribute is used to show the proper shooting mode mark as shown at step 1704.

Figure 17B:
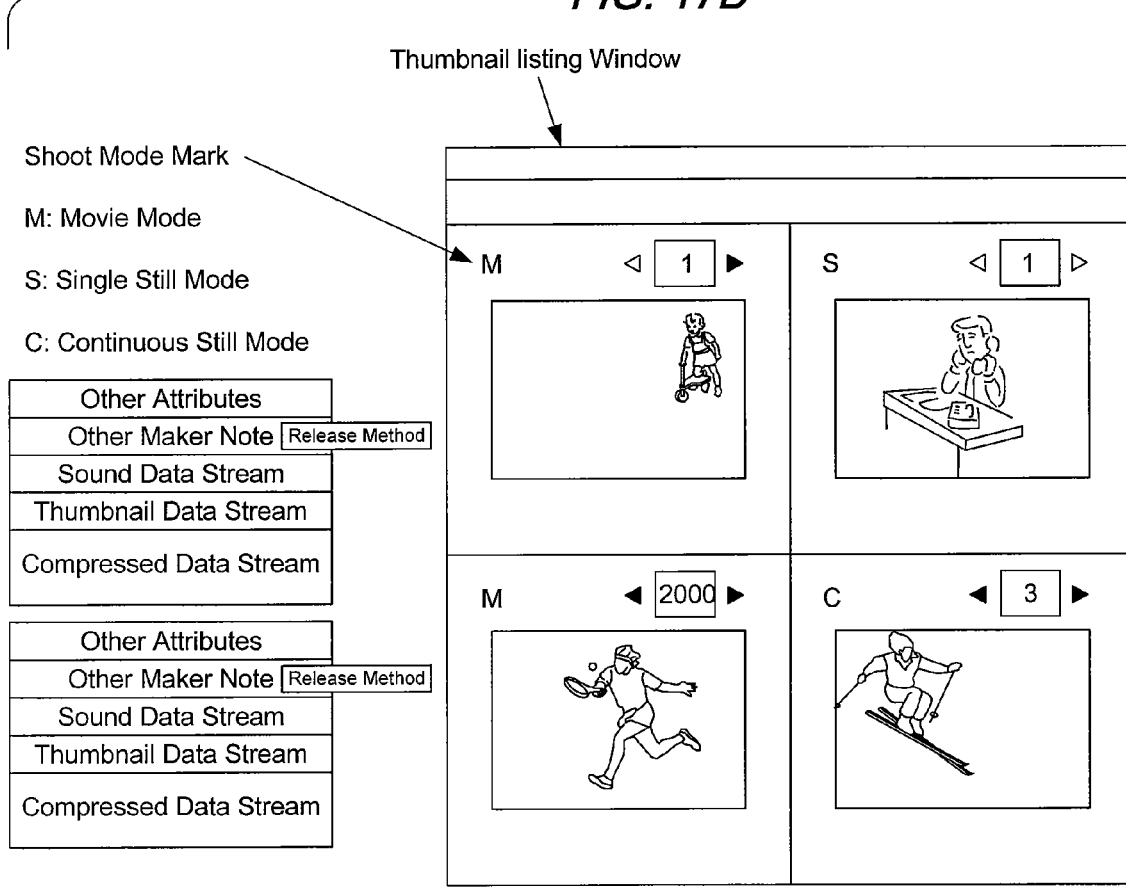
FIG. 17B shows a screen shot of several thumbnails each having a shooting mark used to distinguish the shooting mode for each respective file, in accordance with the flowchart depicted in FIG. 17A.

As shown in FIG. 17B, the shooting mode mark is "M" to designate movie mode, "S" to designate still mode, and "C" to designate continuous mode. To do so, the viewer function reads the values from ReleaseMethod of the MakerNote Tags 808 of the first page of the file, and displays "M", "S", or "C" accordingly. The viewer function assumes that ReleaseMethod of each page has the same value and checks only the first page of the file.

In addition to providing a viewer function, the application also provides a converter function for converting a file to AVI. In addition, the application also provides users a preference allowing them to decide which files will be the target of an AVI conversion operation. For example, a user can select to convert only files recorded in movie mode. Alternatively, another option is to convert files to AVI regardless of the shooting mode in which they were taken.

Figure 18:
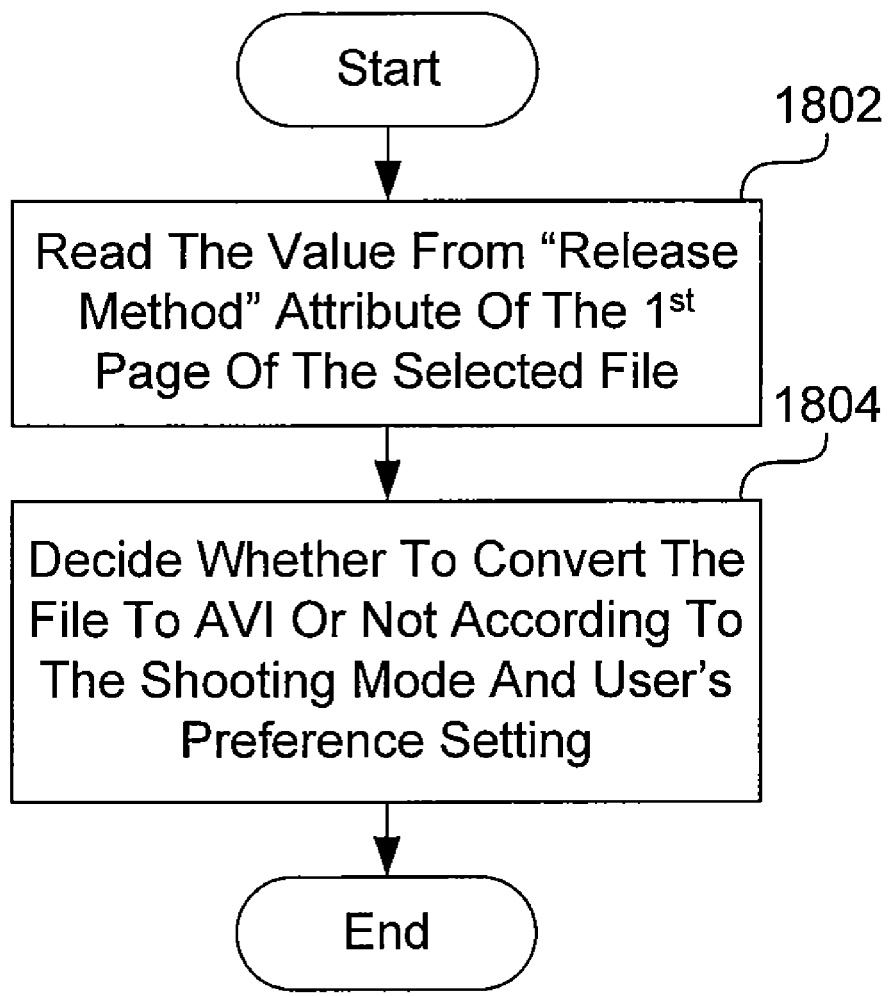
FIG. 18 is a flowchart showing a process for determining the mode in which an image taking process was taken for purposes of converting the image file to AVI.

FIG. 18 is a flowchart showing an initial process 1800 for determining whether a file generated in accordance with the present invention can be converted to AVI. This determination is based on the shooting mode and a user preference setting. Initially, at step 1802, the value of the ReleaseMethod attribute is read for the first page of a selected file. Next, at step 1804 depending on the shooting mode and the user preference setting a determination is made whether to convert a file to AVI in accordance with ReleaseMethod in the MakerNote Tags 808 of the first page of the file. For example, one option would be to convert only files shot in movie mode to AVI. Another option would be to convert a file to AVI regardless of the shooting mode. As described above, the application assumes that all "ReleaseMethod" values from the pages of a file are the same and checks only the first page.

Figure 19:
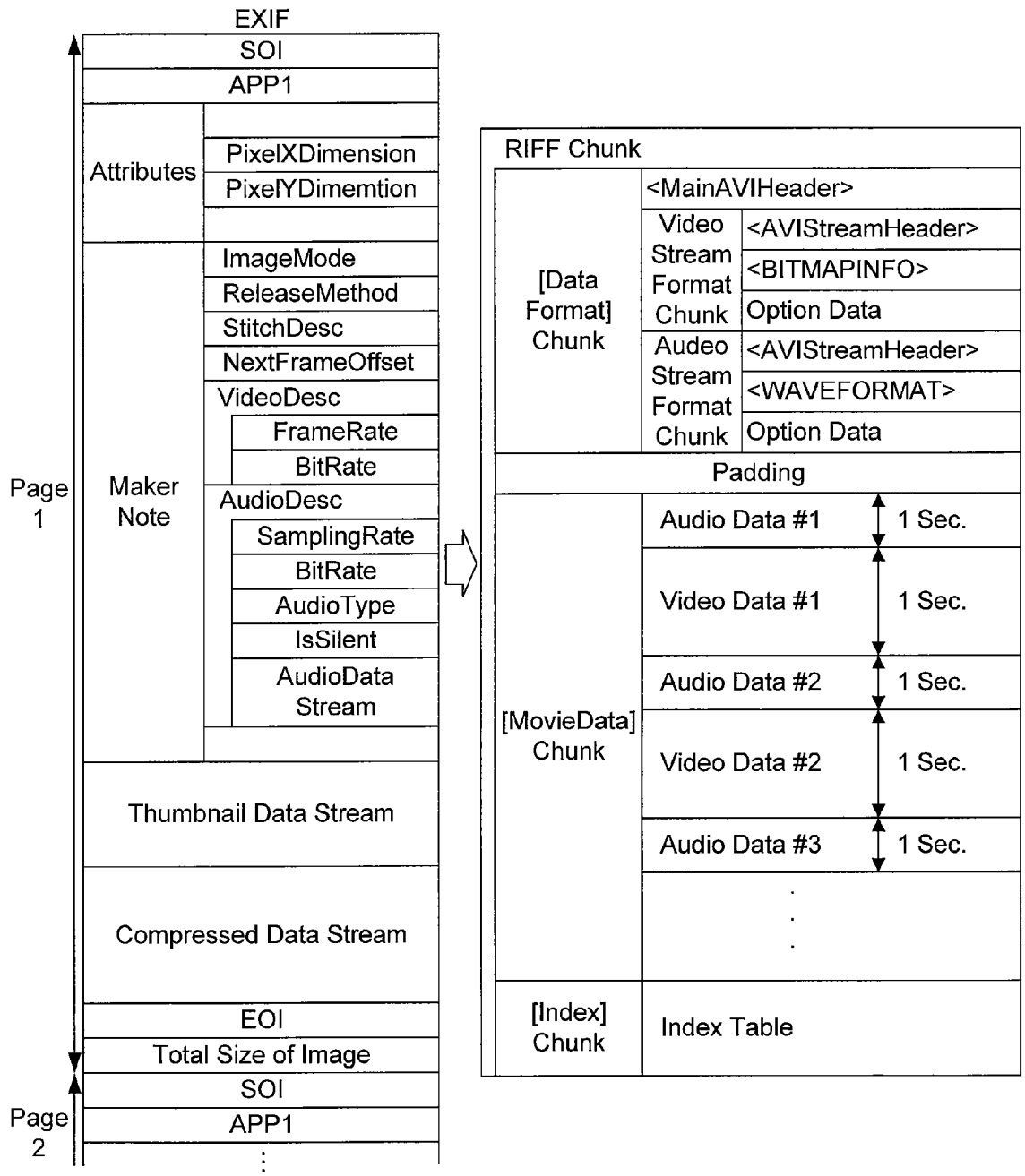
FIG. 19 shows an exemplary data structure of an image file in accordance with an embodiment of the present invention and an AVI data structure.
Figure 20:
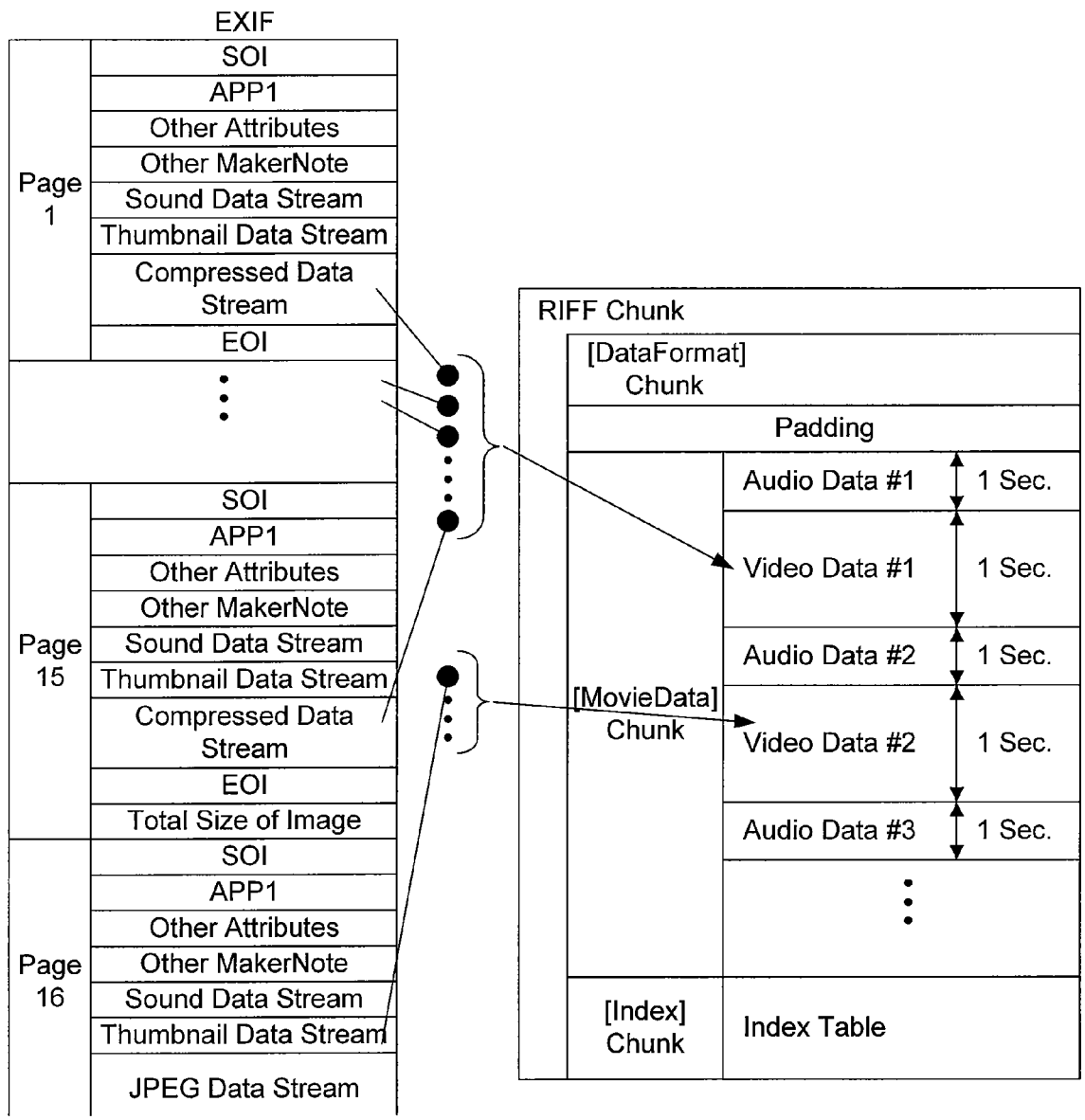
FIG. 20 is a block diagram of an image file and how a movie data chunk is created from the data streams of the image file recorded in accordance with the present invention.

The user can convert a file to AVI by selecting the file and then selecting the "Convert to AVI" command of the application (not shown). FIG. 19 shows which information from a page is used to set the following information in the AVI file when converting from a file to AVI. The right column indicates information in the AVI file.

The converter function counts the total number of pages in the file, and sets the value of TotalFrame in DataFormat Chunk's MainAVIHeader in the AVI file. To make the MovieData Chunk in the AVI file, sound data streams are collected from several pages and merged to one second of AudioDataStream.

Figure 21:
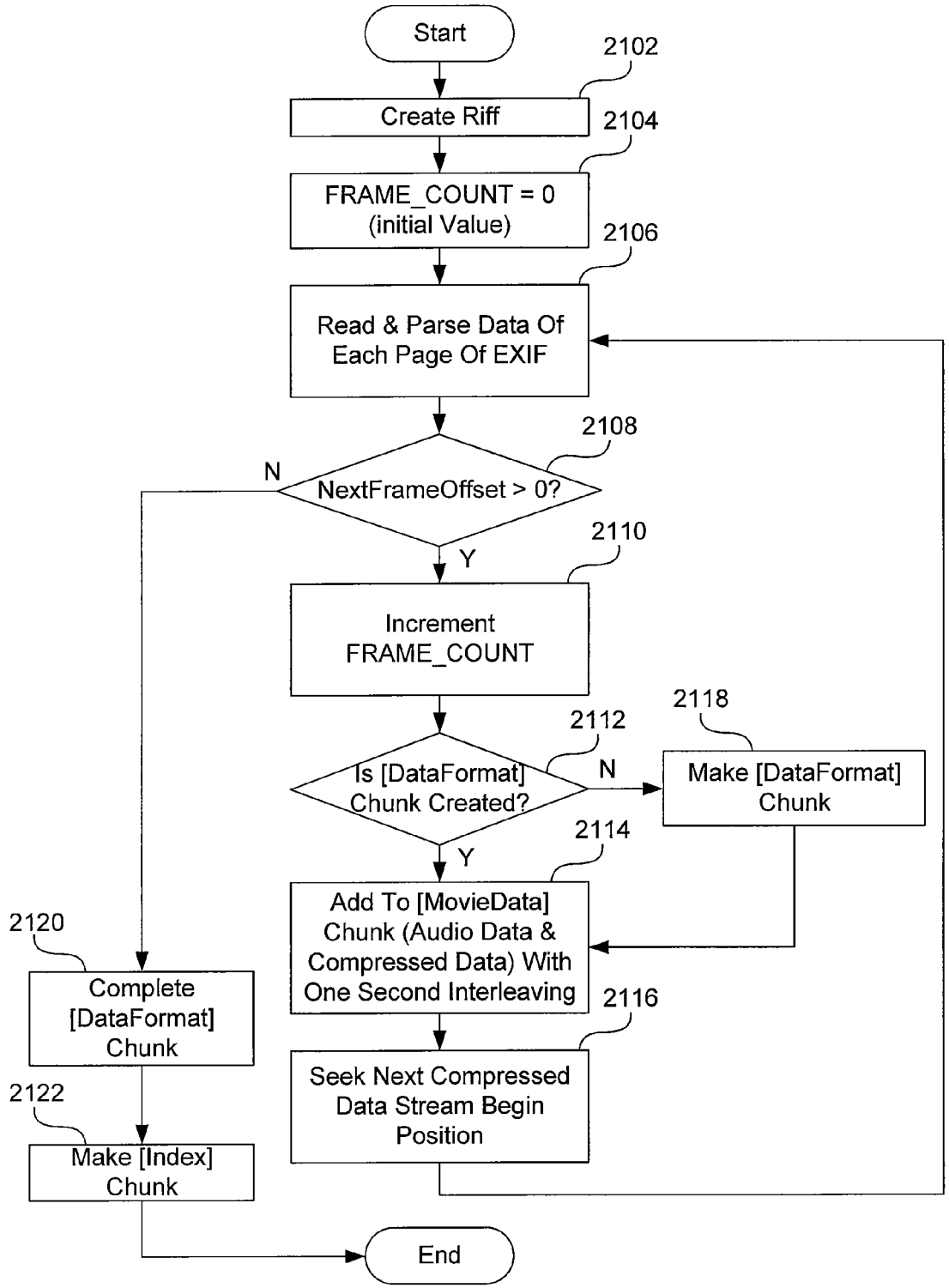
FIG. 21 is a flowchart showing a process for converting a digital image file recorded in accordance with the present invention to an AVI file.

Compressed Data Streams from the pages are also collected and merged to one second of Video Data. The amount of data collected depends on the frame rate value in the MakerNote/VideoDesc. For example, if the frame rate is 15 fps, then 15 Compressed Data Streams are collected. The foregoing algorithm will now be explained in more detail, by describing the following steps of a process 2100 depicted in the flowchart in FIG. 21.

Initially, at step 2102 a Resource Interchange File Format (RIFF) formatted file is created in PC application memory. In step 2104 the FRAME_COUNT field is set to zero. Next, at step 2106, process 2100 reads and parses each page from the Compressed Data Stream 830. A determination is made at step 2108 whether the NextFrameOffset 808(*e*) field value is greater than zero, and if so the process proceeds to step 2110 where the value in the FRAME_COUNT field is incremented. Otherwise at step 2120 the DataFormat Chunk portion of the RIFF is completed.

At step 2112, a determination is made whether the value of the DataFormat Chunk has been created, and if the determination is positive, then process 2100 proceeds to step 2116 where the next Compressed Data Stream position begins. If the determination performed at step 2112 determines that the value of the DataFormat Chunk has not been created at step 2118 the DataFormat chunk is formed by using FrameRate, Height, Width, and other values as discussed above with reference to FIG. 8. At this time some parameters have not yet been set. In step 2114, AudioDataStream and the Compressed Data Stream are also written to the MovieData Chunk. MovieData Chunk is composed of one second interleaving, i.e., one second of audio and one second of video, where the number of frames of one second of video data depends on the frame rate value in the MakerNote/VideoDesc. Step 2116 then seeks the next Compressed Data Stream position and returns to Step 2106. Step 2120 completes the DataFormat chunk, filling the fixed values. Finally, step 2122 the frame address information is set into the index chunk, after parsing the MovieData Chunk to obtain it.

By following the foregoing procedure, the converter function can convert a .JPG file from the camera into an AVI file. After the AVI file has been created, the user may launch a conventional Media Player application on the computer, and then use that application to play the newly-created AVI file. As explained above, the user may also use that application to display the first page of the original file as a still image.

Figure 22:
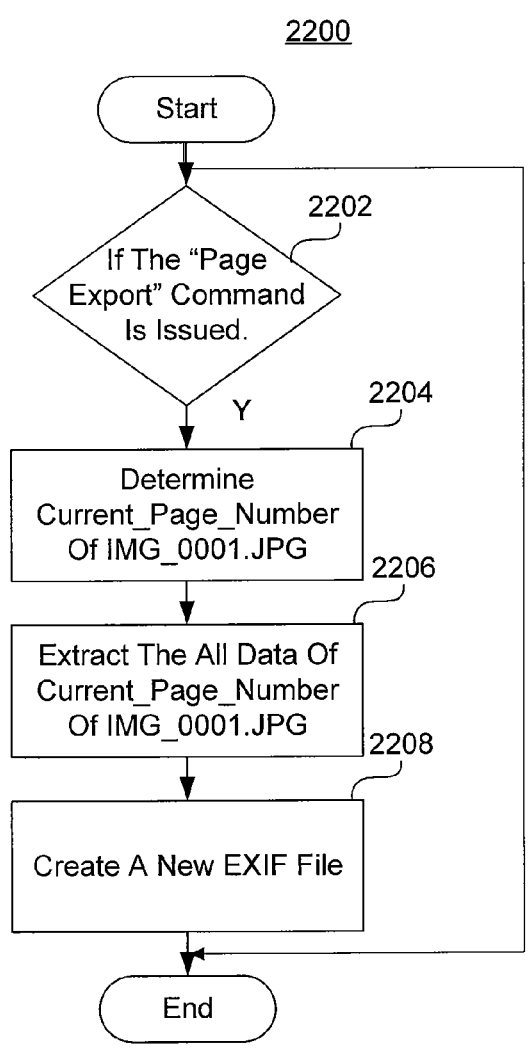
FIG. 22 is a flowchart showing a process for extracting a single page of a file in accordance with the present invention.
Figure 23:
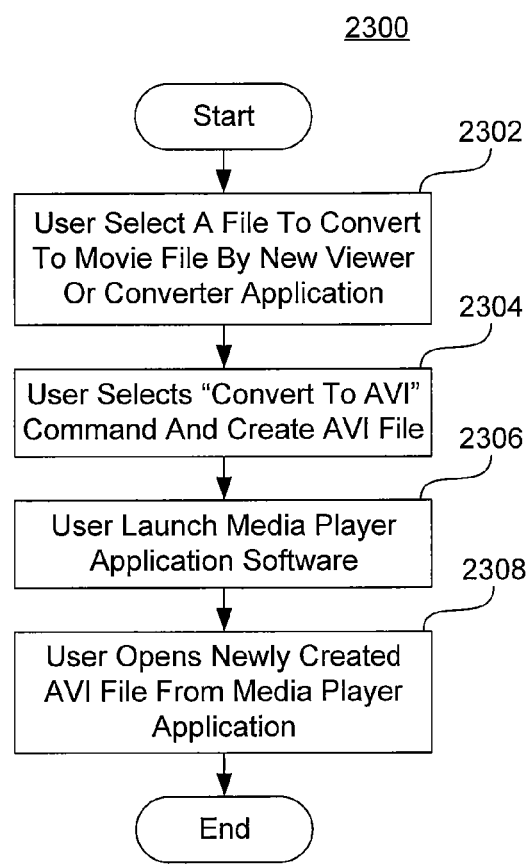
FIG. 23 is a flowchart showing a process for converting a single page which has been extracted from a file to an AVI file.

FIG. 22 is a flowchart of a process 2200 for extracting a single file page from a .JPG file in accordance with the present invention. In addition to converting a JPG file from the camera into an AVI file, the application permits the user to extract a single page from the JPG file. The user can do so by using a "Page Export" function. The extracted page is stored with a JPG extension and can be opened by a conventional EXIF viewer.

Initially at step 2202, a determination is made whether the "Page Export" command has been issued. If so, then at step 2204, the current page number of the JPG file is determined. In step 2206, all of the data of the page corresponding to the current page number is extracted and finally, at step 2208a new file containing that data is created. This allows the user to create a new file containing only one page selected from a file containing plural pages.

The present invention also may be applied to a system having a plurality of devices, e.g., a host computer, an interface device, a reader, and a printer, or to an apparatus consisting of a single device, e.g., a copying machine or a facsimile apparatus.

The aforesaid object of the present invention is achievable by supplying a system with a computer-readable storage medium storing a software program executable by a computer implementing the described functions, and enabling the system to read and execute the programs. In this case, the program codes per se when read from the computer-readable storage medium implement the functions of the described embodiment, and the computer-readable storage medium storing the program codes constitutes one aspect of the present invention. The invention also includes such an embodiment that an operating system (OS) running on a computer executes part or whole of the actual processing in accordance with instructions given by the program codes so as to implement the described functions.

In one form of the present invention, the program codes read from the computer-readable storage medium are written into a memory provided in a function enhancement card or a function enhancement unit inserted into or connected to a computer. In this case, the present invention is accomplished by causing a CPU or the like provided in the enhancement card or unit to execute part or whole of the actual processing so as to implement the described functions.

When the present invention is implemented in the form of a computer-readable storage medium, the computer-readable storage medium stores program codes which correspond to the flowcharts described above.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method of recording image data with a recording apparatus capable of performing a three-mode recording operation for recording in still image, movie, and continuous modes in a file in a storage medium, said method comprising the steps of:
    (a) generating at least one page with the recording apparatus, each page including a header portion and a footer portion, each page comprising:
        i. a mode field containing camera-operation mode data specifying a camera operation mode that includes one of the still image mode, the movie mode, and the continuous mode;
        ii. an image data field containing image data;
        iii. an offset field containing an offset to a next page in said file in the header portion; and
        iv. a total size field containing a page size in the footer portion; and
    (b) recording each said page in said file using the same format with the recording apparatus.

2. The method according to claim 1, wherein said camera operation mode is a still image mode and said offset field contains a predetermined value indicating an absence of a next page.

3. The method according to claim 1, wherein said camera operation mode is selected from the group consisting of a movie mode and a continuous mode, and wherein said generating step generates a plurality of said pages, wherein for a last page of said plurality of pages, said offset is a predetermined value indicating an absence of a next page.

4. The method according to claim 3, each said page further comprising:
    v. a frame rate field containing a frame rate.

5. The method according to claim 1, each said page further comprising:
    v. an audio data stream field for containing audio data; and
    vi. an audio status field containing a predetermined value indicating whether audio data is present in said audio data stream field.

6. A camera capable of performing a three-mode recording operation for recording in still image, movie, and continuous modes comprising:
    a section that generates at least one page, wherein each said page includes a header portion and a footer portion and each said page comprises:
        i. a mode field containing camera-operation mode data specifying a camera operation mode that includes one of the still image mode, the movie mode, and the continuous mode;
        ii. an image data field containing image data;
        iii. an offset field containing an offset to a next page in said file in the header portion;
        iv. a total size field containing a page size in the footer portion; and
    a recorder that records each said page in a file in a memory using the same format.

7. A camcorder capable of performing a three-mode recording operation for recording in still image, movie, and continuous modes comprising:

a section that generates at least one page, wherein each said page includes header and footer portions and each said page comprises:
- i. a mode field containing camera-operation mode data specifying a camera operation mode that includes one of the still image mode, the movie mode, and the continuous mode;
- ii. an image data field containing image data;
- iii. an offset field containing an offset to a next page in said file in the header portion;
- iv. a total size field containing a page size in the footer portion; and a recorder that records each said page in a file in a memory using the same format.

8. An image recording apparatus for arranging digital data in a file and capable of performing a three-mode recording operation for recording in still image, movie, and continuous modes, comprising:

a section that generates at least one page, wherein each said page includes header and footer portions and each said page comprises:
- i. a mode field containing camera-operation mode data specifying a camera operation mode that includes one of the still image mode, the movie mode, and the continuous mode;
- ii. an image data field containing image data;
- iii. an offset field containing an offset to a next page in said file in the header portion; and
- iv. a total size field containing a page size in the footer portion, whereby said apparatus records each said page in said file on a memory coupled to said apparatus using the same format.

9. The image recording apparatus of claim 8, wherein said camera operation mode is a still image mode and said offset field contains a predetermined value indicating an absence of a next page.

10. The image recording apparatus of claim 8, wherein said camera operation mode is selected from the group consisting of a movie mode and a continuous mode, wherein said section further generates a plurality of said pages, and wherein for a last page of said plurality of pages, said offset is a predetermined value indicating an absence of a next page.

11. The image recording apparatus of claim 10, wherein each said page further comprises:
- v. a frame rate field containing a frame rate.

12. The image recording apparatus of claim 8, wherein each said page further comprises:
- v. an audio data stream field for containing audio data; and
- vi. an audio status field containing a predetermined value indicating whether audio data is present in said audio data stream field.

13. A computer-readable storage medium embodying a computer-executable program, said computer-readable storage medium comprising a system memory embodying a program having program codes for instructing a computer comprising a controller to perform a method for processing digital data and arranging the digital data in a file and performing a three-mode recording operation for recording in still image, movie, and continuous modes, said method comprising:

(a) generating at least one page with a file section controlled by the controller according to the program embodied in the system memory, each page including header and footer portions and comprising:
- i. a mode field containing camera-operation mode data specifying a camera operation mode that includes one of the still image mode, the movie mode, and the continuous mode;
- ii. an image data field containing image data;
- iii. an offset field containing an offset to a next page in said file in the header portion, and
- iv. a total size field containing a page size in the footer portion; and (b) recording, with said file section, under the control of the controller according to the program, each said page in said file using the same format.

14. A method of reproducing one or more images with an image reproducing apparatus from digital data arranged in a file in a storage medium, said method comprising the steps of:

(a) reading a page recorded in said file, the page including a header portion and a footer portion, and reading from the page:
- i. a mode field containing camera-operation mode data specifying a camera operation mode that includes one of a still image mode, a movie mode, and a continuous mode;
- ii. an image data field containing image data;
- iii. an offset field, wherein said offset field contains an offset to a next page in said file in the header portion when said next page exists in said file, and
- iv. a total size field containing a page size in the footer portion;

(b) reproducing said image data;

(c) searching for a second page containing image data to be reproduced in said file, wherein when the image reproducing apparatus searches in a forward direction, the second cage is pointed to by said offset field, and when the image reproducing apparatus searches in a backward direction, the location of the second cage is determined using the total size field; and (d) repeating steps (a), (b), and (c) for the second cage in said file.

15. The method according to claim 14, further comprising the step of:

(e) terminating said step (d) if said offset field indicates an absence of a next page.

16. The method according to claim 14, wherein said camera operation mode is selected from the group consisting of a movie mode and a continuous mode, wherein said file contains a plurality of pages, and wherein for a last page of a plurality of pages, said offset field is a predetermined value indicating an absence of a next page.

17. The method according to claim 16, further comprising reading from the page:
- v. a frame rate field containing a frame rate.

18. The method according to claim 14, further comprising reading from the page:
- v. an audio data stream field for containing audio data; and
- vi. an audio status field containing a predetermined value indicating whether audio data is present in said audio data stream field.

19. The method according to claim 18, further comprising the step of:

(e) reproducing said audio data.

20. A camera capable of reproducing one or more images from digital data arranged in a file in a storage medium, said camera comprising:

a reading section that reads plural pages recorded in said file, wherein each said cage includes a header portion and a footer portion and each said cage comprises:
- i. a mode field containing camera-operation mode data specifying a camera operation mode that includes one of the still image mode, the movie mode, and the continuous mode;
- ii. an image data field containing image data;

iii. an offset field containing an offset to a next cage in said file in the header portion;

iv. a total size field containing a cage size in the footer portion; and a reproducing section that reproduces said image data; and a searching section that searches for a second cage containing image data to be reproduced in said file, wherein when the searching section searches in a forward direction, the second cage is pointed to by said offset field, and when the image reproducing apparatus searches in a backward direction, the location of the second cage is determined using the total size field.

21. A camcorder capable of reproducing one or more images from digital data arranged in a file in a storage medium, said camera comprising:

a reading section that reads plural pages recorded in said file, wherein each said cage includes a header portion and a footer portion and each said cage comprises:

i. a mode field containing camera-operation mode data specifying a camera operation mode that includes one of the still image mode, the movie mode, and the continuous mode;

ii. an image data field containing image data;

iii. an offset field containing an offset to a next cage in said file in the header portion;

iv. a total size field containing a cage size in the footer portion; and a reproducing section that reproduces said image data; and a searching section that searches for a second cage to be reproduced in said file, wherein when the searching section searches in a forward direction, the second cage is pointed to by said offset field, and when the image reproducing apparatus searches in a backward direction, the location of the second cage is determined using the total size field.

22. An image reproducing apparatus for reproducing one or more images from digital data arranged in a file in a storage medium, comprising:

a reading section that reads plural pages recorded in said file, wherein each said cage includes a header portion and a footer portion and each said cage includes:

i. a mode field containing camera-operation mode data specifying a camera operation mode that includes one of the still image mode, the movie mode, and the continuous mode;

ii. an image data field containing image data:

iii. an offset field containing an offset to a next cage in said file in the header portion;

iv. a total size field containing a cage size in the footer portion; and a reproducing section that reproduces said image data; and a searching section that searches for a second cage containing image data to be reproduced in said file, wherein when the searching section searches in a forward direction, the second cage is pointed to by said offset field, and when the image reproducing apparatus searches in a backward direction, the location of the second cage is determined using the total size field.

23. The image reproducing apparatus of claim 22, wherein, for a plurality of pages in said file having the same format, each said page is read and corresponding image data is reproduced, and wherein said reading section is terminated if said offset field indicates an absence of a next page.

24. The image reproducing apparatus of claim 22, wherein said camera operation mode is selected from the group consisting of a movie mode and a continuous mode, and wherein for a last page of a plurality of pages, said offset is a predetermined value indicating an absence of a next page.

25. The image reproducing apparatus of claim 24, wherein each said page further includes:

v. a frame rate field containing a frame rate.

26. The image reproducing apparatus of claim 22, wherein each said page further includes:

v. an audio data stream field for containing audio data; and vi. an audio status field containing a predetermined value indicating whether audio data is present in said audio data stream field.

27. The image reproducing apparatus of claim 26, further comprising:

audio reproducing means for reproducing said audio data.

28. A computer-readable storage medium embodying a computer-executable program, said computer-readable storage medium comprising a system memory embodying a program having program codes for instructing a computer comprising a controller to perform a method for processing digital data and reproducing the digital data in a file, said method comprising:

(a) reading a page recorded in said file, the page including a header portion and a footer portion, and reading from the page:

i. a mode field containing camera-operation mode data specifying a camera operation mode that includes one of a still image mode, a movie mode, and a continuous mode;

ii. an image data field containing image data;

iii. an offset field, wherein said offset field contains an offset to a next page in said file in the header portion when said next page exists in said file, and iv. a total size field containing a page size in the footer portion;

(b) reproducing said image data;

(c) searching for a second page containing image data to be reproduced in said file, wherein when the image reproducing apparatus searches in a forward direction, the second cage is pointed to by said offset field, and when the image reproducing apparatus searches in a backward direction, the location of the second cage is determined using the total size field; and (d) repeating steps (a), (b), and (c) for the second cage in said file.

29. An image recording apparatus, comprising:

image inputting means for inputting a plurality of images; and recording means for forming, based on said image, an image file containing a plurality of pages, each said page including header and footer portions, each said page comprising a JPEG compressed image, an offset field containing an offset to a next page in said file in the header portion, and a total size field containing a page size in the footer portion, and for recording, for each of said plurality of pages, a thumbnail, appendix information, audio information, and additional information necessary for formation of a movie image file.

30. An image recording method, comprising:

inputting a plurality of images; and forming, based on said image, an image file containing a plurality of pages, each said page including header and footer portions, each said page comprising a JPEG compressed image, an offset field containing an offset to a next page in said file in the header portion, and a total size field containing a page size in the footer portion, and recording, with a recording means, for each of said plurality of pages, a thumbnail, appendix information, audio information, and additional information necessary for formation of a movie image file.

31. A computer program product comprising a computer usable medium having control logic stored therein for causing a computer to record a plurality of images, said control logic comprising:
first computer readable program code for causing the computer to input a plurality of images; and
second computer readable program code for causing the computer to form, based on said plurality of images, an image file containing a plurality of pages, each said cage including header and footer portions, each said page comprising a JPEG compressed image, an offset field containing an offset to a next page in said file in the header portion, and a total size field containing a page size in the footer portion, and for causing the computer to record, for each of said plurality of pages, a thumbnail, appendix information, audio information, and additional information necessary for formation of a movie image file.

* * * * *